(12) United States Patent
Motomiya et al.

(10) Patent No.: US 11,990,283 B2
(45) Date of Patent: May 21, 2024

(54) CERAMIC ELECTRONIC COMPONENT, SUBSTRATE ARRANGEMENT AND METHOD OF MANUFACTURING CERAMIC ELECTRONIC COMPONENT

(71) Applicant: TAIYO YUDEN CO., LTD., Tokyo (JP)

(72) Inventors: Yoshiyuki Motomiya, Tokyo (JP); Masahiko Hirano, Tokyo (JP); Yasutomo Suga, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 67 days.

(21) Appl. No.: 17/542,920

(22) Filed: Dec. 6, 2021

(65) Prior Publication Data
US 2022/0181088 A1    Jun. 9, 2022

(30) Foreign Application Priority Data

Dec. 7, 2020   (JP) ................. 2020-202423

(51) Int. Cl.
*H01G 4/30*    (2006.01)
*H01G 2/06*    (2006.01)
*H01G 4/008*   (2006.01)
*H01G 4/012*   (2006.01)
*H01G 4/12*    (2006.01)
*H01G 4/224*   (2006.01)

(52) U.S. Cl.
CPC .............. *H01G 4/30* (2013.01); *H01G 2/065* (2013.01); *H01G 4/008* (2013.01); *H01G 4/012* (2013.01); *H01G 4/1218* (2013.01); *H01G 4/224* (2013.01)

(58) Field of Classification Search
CPC .......... H01G 4/30; H01G 2/065; H01G 4/008; H01G 4/012; H01G 4/1218; H01G 4/224
See application file for complete search history.

(56) References Cited

U.S. PATENT DOCUMENTS

2010/0091426 A1*  4/2010  Motoki .............. H01C 7/18
                                               29/25.42
2015/0084487 A1*  3/2015  Mori ................ H01G 4/248
                                               336/200
(Continued)

FOREIGN PATENT DOCUMENTS

JP    2020-21930 A    2/2020

*Primary Examiner* — Michael P McFadden
(74) *Attorney, Agent, or Firm* — CHEN YOSHIMURA LLP

(57) ABSTRACT

A ceramic electronic component includes an element body and at least one external electrode formed on the element body. The element body includes a dielectric and at least one internal electrode therein. The element body has a plurality of surfaces, and these surfaces include a first surface and a second surface opposite the first surface. Each external electrode includes a base layer and a plating layer formed on the base layer. The base layer is in contact with the internal electrode, contains a metal, and has a first end face adjacent to an outer periphery of the second surface of the element body. The plating layer has a second end face adjacent to an outer periphery of the first end face such that the first and second end faces form, in combination, a multilayer structure on the outer periphery of the second surface of the element body.

14 Claims, 19 Drawing Sheets

(56) References Cited

U.S. PATENT DOCUMENTS

| | | | |
|---|---|---|---|
| 2016/0093438 A1* | 3/2016 | Sasabayashi | H01G 4/12 |
| | | | 361/301.4 |
| 2017/0250028 A1* | 8/2017 | Makino | H01G 4/005 |
| 2017/0278634 A1* | 9/2017 | Kato | H01G 4/0085 |
| 2017/0345572 A1* | 11/2017 | Sasaki | H01G 4/232 |
| 2019/0096583 A1* | 3/2019 | Sasaki | H01G 4/012 |
| 2020/0035417 A1 | 1/2020 | Sakurai et al. | |
| 2021/0104507 A1* | 4/2021 | Patil | H05K 1/185 |

* cited by examiner

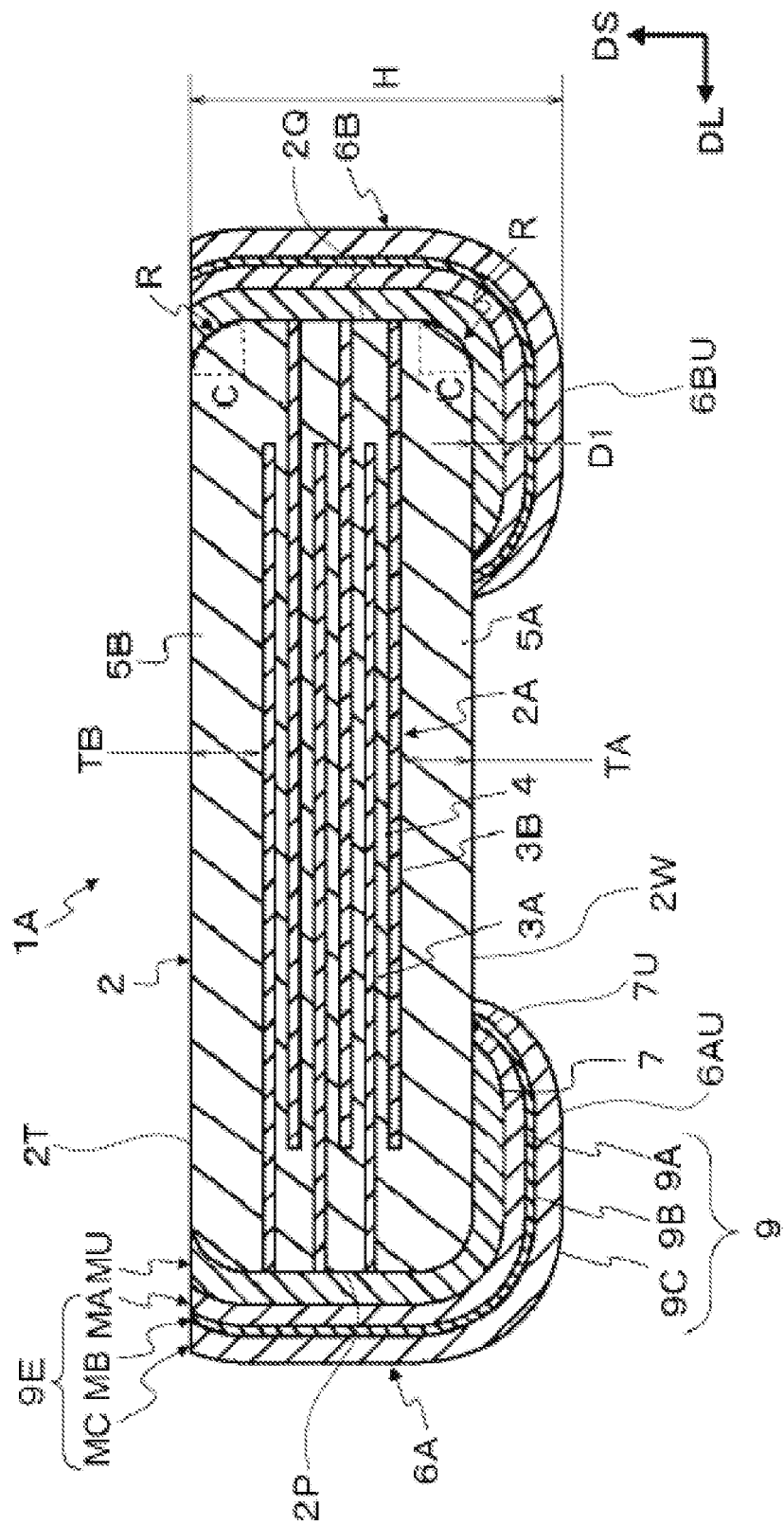

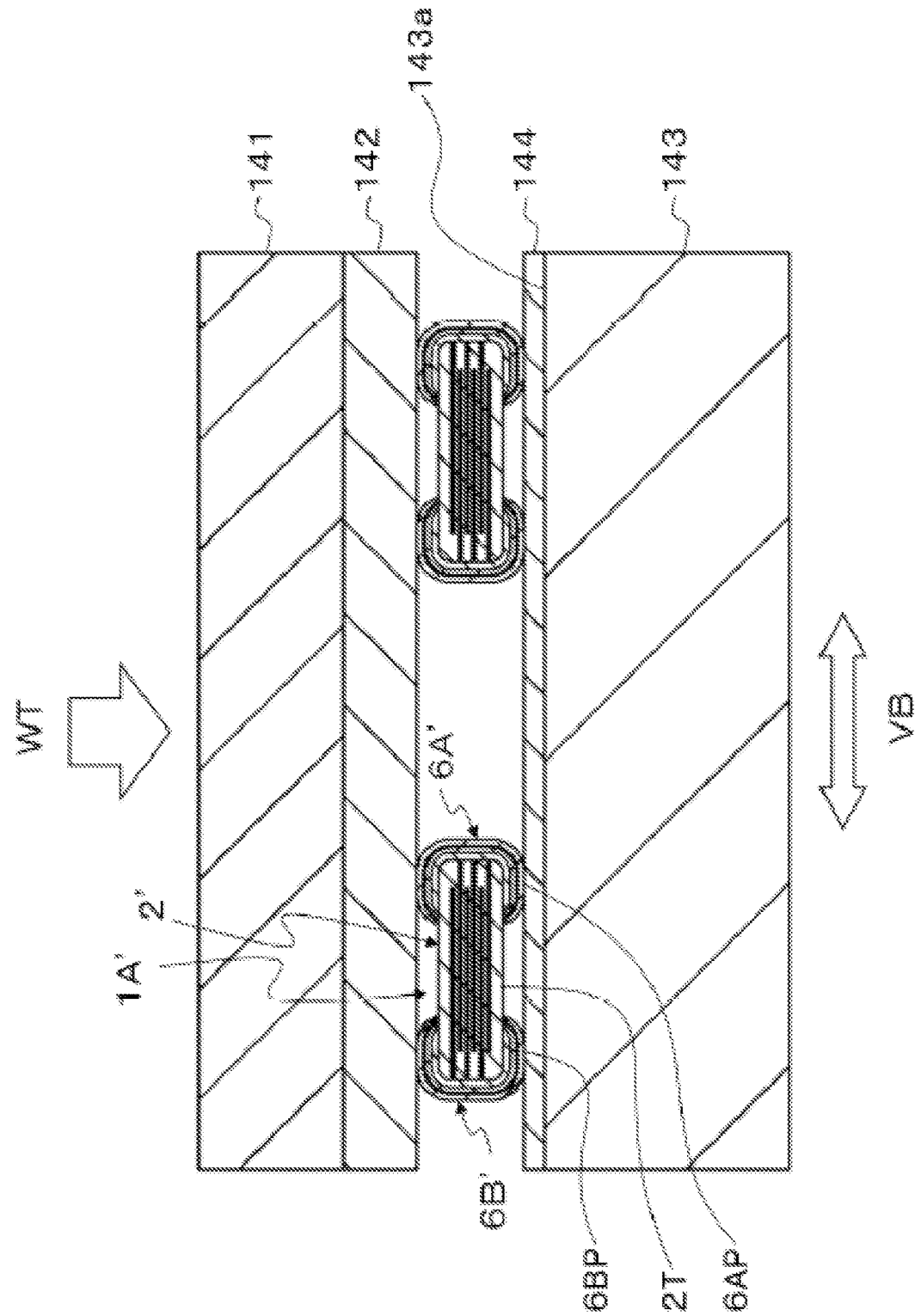

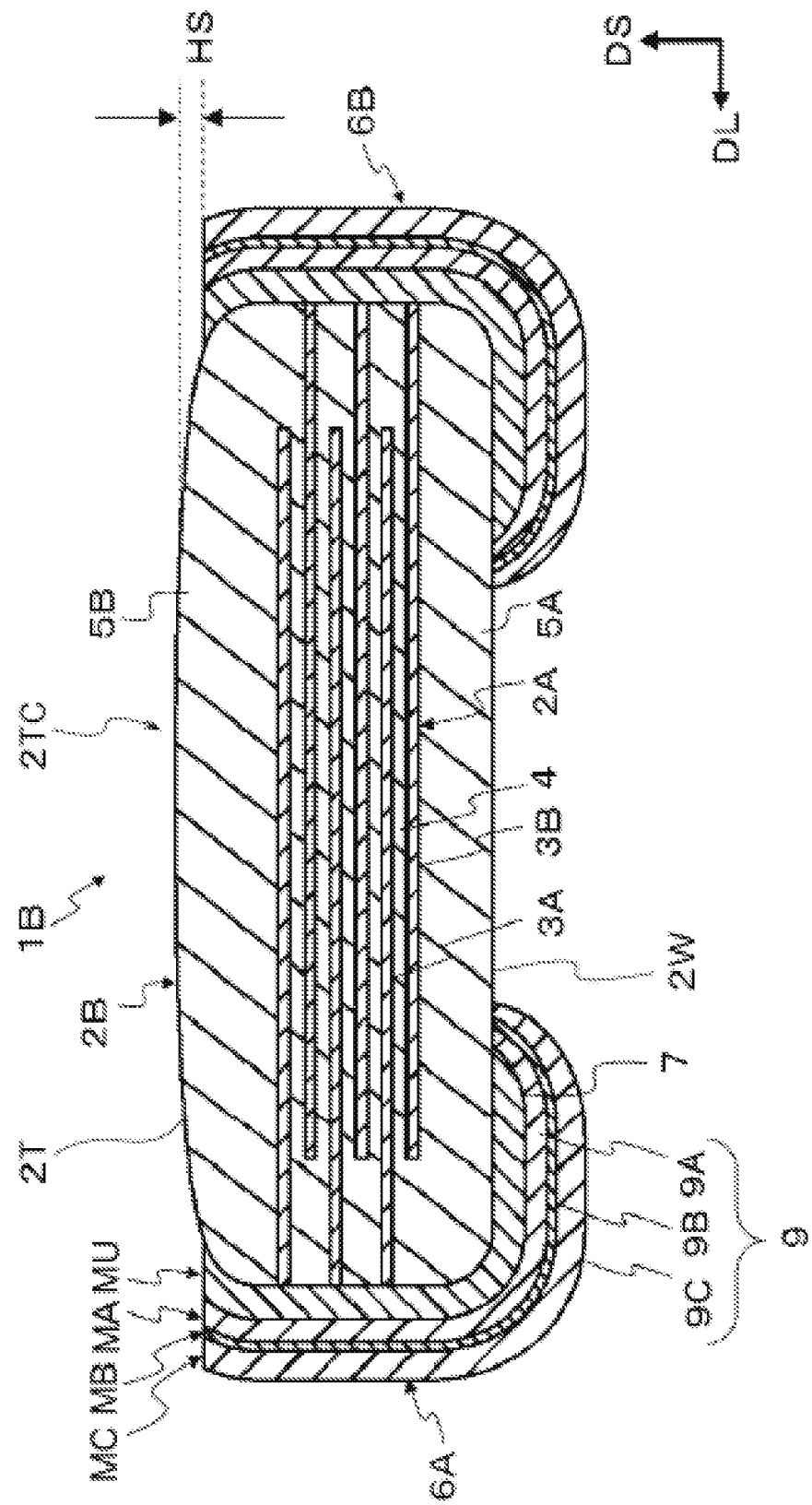

CERAMIC ELECTRONIC COMPONENT, SUBSTRATE ARRANGEMENT AND METHOD OF MANUFACTURING CERAMIC ELECTRONIC COMPONENT

FIELD OF THE INVENTION

The present invention relates to a ceramic electronic component, a substrate arrangement, and a method of manufacturing the ceramic electronic component.

DESCRIPTION OF THE RELATED ART

As electronic devices become smaller and more sophisticated, a mounting density of electronic components mounted on a board (substrate) is increasing. In order to reduce an area occupied by the electronic components mounted on an ordinary mounting surface, on which IC (integrated circuit) chips, etc., are mounted, the height of a multilayer ceramic capacitor is reduced and the multilayer ceramic capacitor is mounted on an surface opposite to the ordinary mounting surface of the substrate. This capacitor may be referred to as an LSC (land-side capacitor).

To reduce the height of the multilayer ceramic capacitor, an element body of the multilayer ceramic capacitor may be made thinner. When the element body becomes thinner, the transverse rupture strength of the multilayer ceramic capacitor drops. The thin multilayer ceramic capacitor may crack when the multilayer ceramic capacitor is mounted on a substrate.

JP-A-2020-21930 discloses a configuration that can reduce the height of the multilayer ceramic capacitor without thinning the element body. Specifically, terminal electrodes are not formed on a lower surface of the element body in JP-A-2020-21930. In order to form no terminal electrodes on the lower surface of the element body, two element bodies are attached to each other at the respective lower surfaces of the two element bodies, and the terminal electrodes are formed on the respective upper surfaces of the two element bodies. Then, the two element bodies are separated from each other.

SUMMARY OF THE INVENTION

In the configuration disclosed in JP-A-2020-21930, if the thickness of the individual element body is 100 µm or less, the strength of the element body is very weak. Thus, it is difficult to separate the two element bodies from each other in a desired manner.

If the two element bodies are separated from each other in an undesired manner, the terminal electrodes may be broken and may have rough fractured surfaces. Such electrode surfaces are difficult to entirely adhere to the element body. As a result, the adhesion of the terminal electrodes to the element body is deteriorated after the element body is mounted on the substrate. This would result in failure of a device that includes such element body and terminal electrodes.

When electroplating is applied to the terminal electrodes, plating is deposited on the assumption that the electrode portions of the element body are electrically in contact with the terminal electrodes. If the terminal electrodes are broken and the conductive contact between the electrode portions of the element body and the terminal electrodes is lost (or weakened), the plating layers of the terminal electrodes become thin and non-uniform.

An objective of the present invention is to provide a ceramic electronic component that can suppress a decrease in transverse rupture strength, while reducing the height of the ceramic electronic component without breakage of external electrodes. Another objective of the present invention is to provide a method of manufacturing such ceramic electronic component. Still another objective of the present invention is to provide a substrate arrangement that includes a substrate and the ceramic electronic component mounted on the substrate.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a ceramic electronic component that includes an element body and at least one external electrode formed on the element body. The element body includes a dielectric and at least one internal electrode therein. The element body has a plurality of surfaces, and these surfaces include a first surface and a second surface opposite the first surface. Each external electrode includes a base layer and a plating layer formed on the base layer. The base layer is in contact with the internal electrode, contains a metal, and has a first end face adjacent to an outer periphery of the second surface of the element body. The plating layer has a second end face adjacent to an outer periphery of the first end face such that the first and second end faces form, in combination, a multilayer structure on the outer periphery of the second surface of the element body.

The external electrodes may be formed to cover portions of at least two of the surfaces of the element body except for the second surface.

The first end face of the base layer may not be covered with the plating layer. A portion of the base layer that extends on a portion of the first surface may be covered with the plating layer.

The surfaces of the element body may include at least one third surface perpendicular to the first and second surfaces. The base layer may be formed on each third surface. The plating layer may be formed on the base layer formed on each third surface. The first end face of the base layer and the second end face of the plating layer may be level to the second surface of the element body.

The base layer may have a third end face, and the plating layer may have a fourth end face such that the third end face and the fourth end face are level to the first surface of the element body.

The first end face of the base layer may be located outside the second surface of the element body. The second end face of the plating layer may be located outside the first end face of the base layer.

The first end face and the second end face may be flat surfaces, respectively.

A normal direction of the second surface, a normal direction of the first end face, and a normal direction of the second end face may be parallel to each other.

The element body may have a curved surface at each of corner portions of the second surface. The curved surface may be made by chamfering. The first end face of the base layer may extend wrapping the curved surface up to a flat portion of the second surface of the element body.

The second end face of the plating layer may extend wrapping along a wrapping portion of the base layer up to the flat portion of the second surface of the element body.

A radius of curvature of the curved surface may be between 5 μm and 20 μm.

A center portion of the second surface may be raised relative to the first end face and the second end face.

An amount of raising of the center portion of the second surface relative to the first end face and the second end face may be 3 μm or less.

Surface roughness of the second surface of the element body may be smaller than surface roughness of the first surface of the element body.

The surface roughness of the second surface of the element body may be 0.20 μm or less.

The plating layer may have a multilayer structure that includes a plurality of sub-plating layers having different metal components. Each of the sub-plating layers has an end face. The second end face of the plating layer may be defined by the respective end faces of the sub-plating layers such that the end faces of the sub-plating layers may form a multilayer structure outside the element body.

The internal electrode may include at least one first internal electrode layer and at least one second internal electrode layer. The element body may include a laminate that has at least one dielectric layer having the dielectric, the first internal electrode layer(s) and the second internal electrode layer(s) such that the first internal electrode layer(s) and the second internal electrode layer(s) are alternately laminated via the dielectric layer(s). The surfaces of the element body may include two opposite third surfaces that are perpendicular to the first and second surfaces respectively. The external electrodes may include a first external electrode and a second external electrode provided separately on the two third surfaces, respectively. The first inner electrode layer(s) may be connected to the first external electrode. The second inner electrode layer(s) may be connected to the second external electrode.

According to a second aspect of the present invention, there is provided an arrangement or a device that includes a substrate, and the above-described ceramic electronic component mounted on the substrate via at least one solder layer. The respective solder layer is wetted up onto a side surface of the external electrode without reaching the second surface of the element body.

The arrangement may further include a resin for sealing the ceramic electronic component on the substrate, and at least one solder ball provided on a predetermined surface of the substrate. The ceramic electronic component may be mounted on the predetermined surface of the substrate at a different location from the solder ball(s).

According to a third aspect of the present invention, there is provided a method of manufacturing a ceramic electronic component. The method includes forming an element body that includes a dielectric and at least one internal electrode. The element body has two side surfaces and four other surfaces that are perpendicular to the two side surfaces. The method also includes applying a base material for external electrodes on the two side surfaces and predetermined areas of the four other surfaces of the element body. The method also includes sintering the base material to form base layers for the external electrodes. The method also includes forming a plating layer on each of the base layers. The method also includes removing the base layer and the plating layer from one of the four other surfaces of the element body.

Removing the base layer and the plating layer from the above-mentioned one surface of the element body may include physically polishing the above-mentioned one surface—+ of the element body.

According to the present invention, it is possible to reduce the height of the ceramic electronic component while suppressing the decrease in the bending strength. It is also possible to avoid the breakage of the external electrode(s).

It is to be understood that both the foregoing general description and the following detailed description are exemplary and explanatory, and are intended to provide further explanation of the invention as claimed.

BRIEF DESCRIPTION OF THE DRAWINGS

FIG. 2A is a cross-sectional view taken along the length of the multilayer ceramic capacitor of FIG. 1.

FIG. 6B is another cross-sectional view showing an exemplary process of removing the outer electrodes from the upper surface of the element body of the multilayer ceramic capacitor according to the first embodiment.

FIG. 8 is a cross-sectional view showing an exemplary configuration of a multilayer ceramic capacitor according to a third embodiment of the present invention.

DESCRIPTION OF THE EMBODIMENTS

Embodiments of the present invention will be described in detail with reference to the accompanying drawings. The following embodiments do not limit the scope of the invention. Not all combinations of features described in the embodiments may be essential to the invention. The embodiments may be modified or changed depending on the specifications of the device to which the invention is applied and various conditions (usage conditions, usage environment, etc.). The technical scope of the present invention is defined by the claims and is not limited by the following individual embodiments. The drawings used conjunction with the following description may differ in scale and shape from the actual structure in order to make each configuration easier to understand.

First Embodiment

Figure 1:
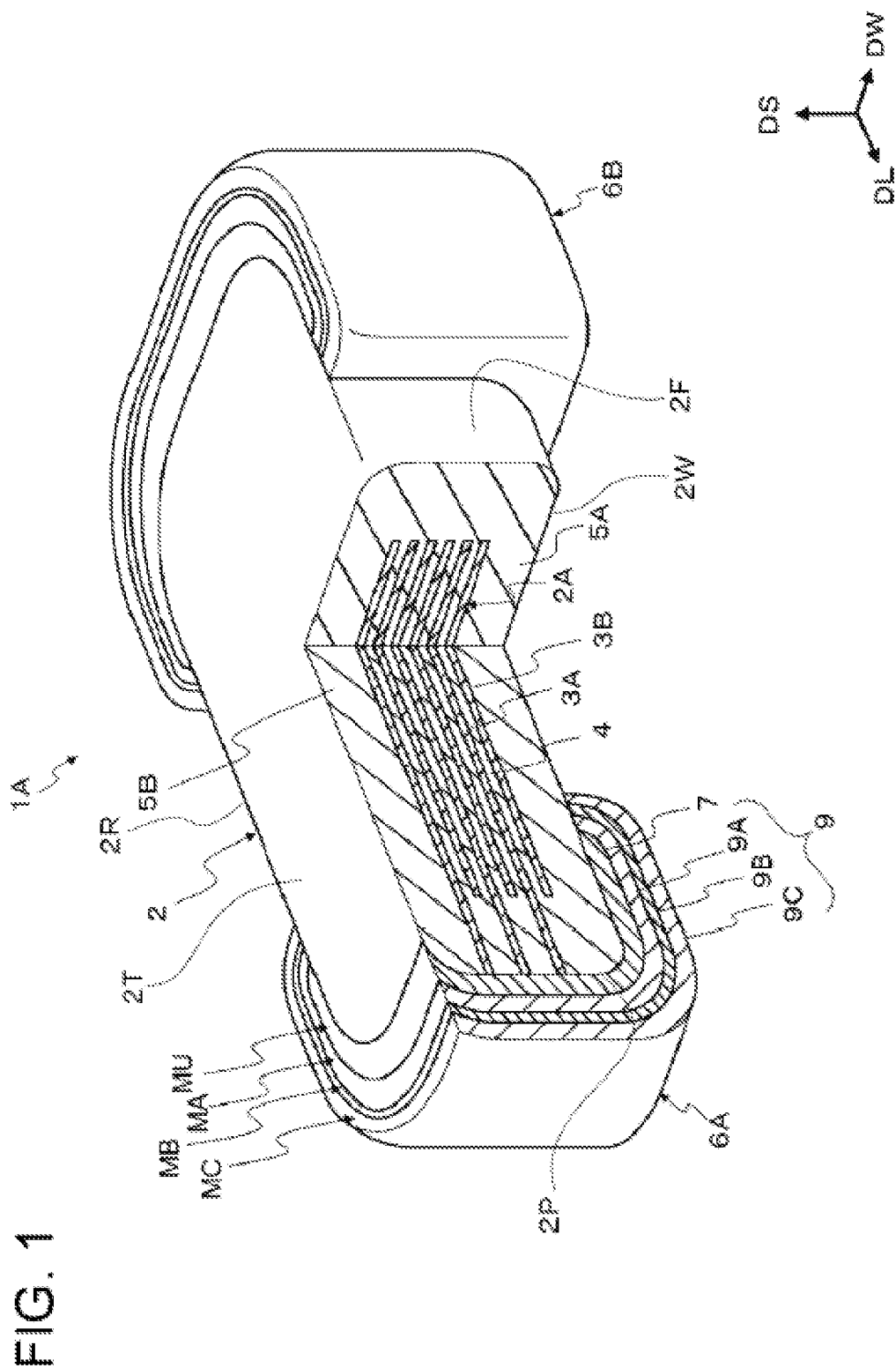
FIG. 1 is a perspective view showing an exemplary configuration of a multilayer ceramic capacitor according to a first embodiment of the present invention.
Figure 2B:
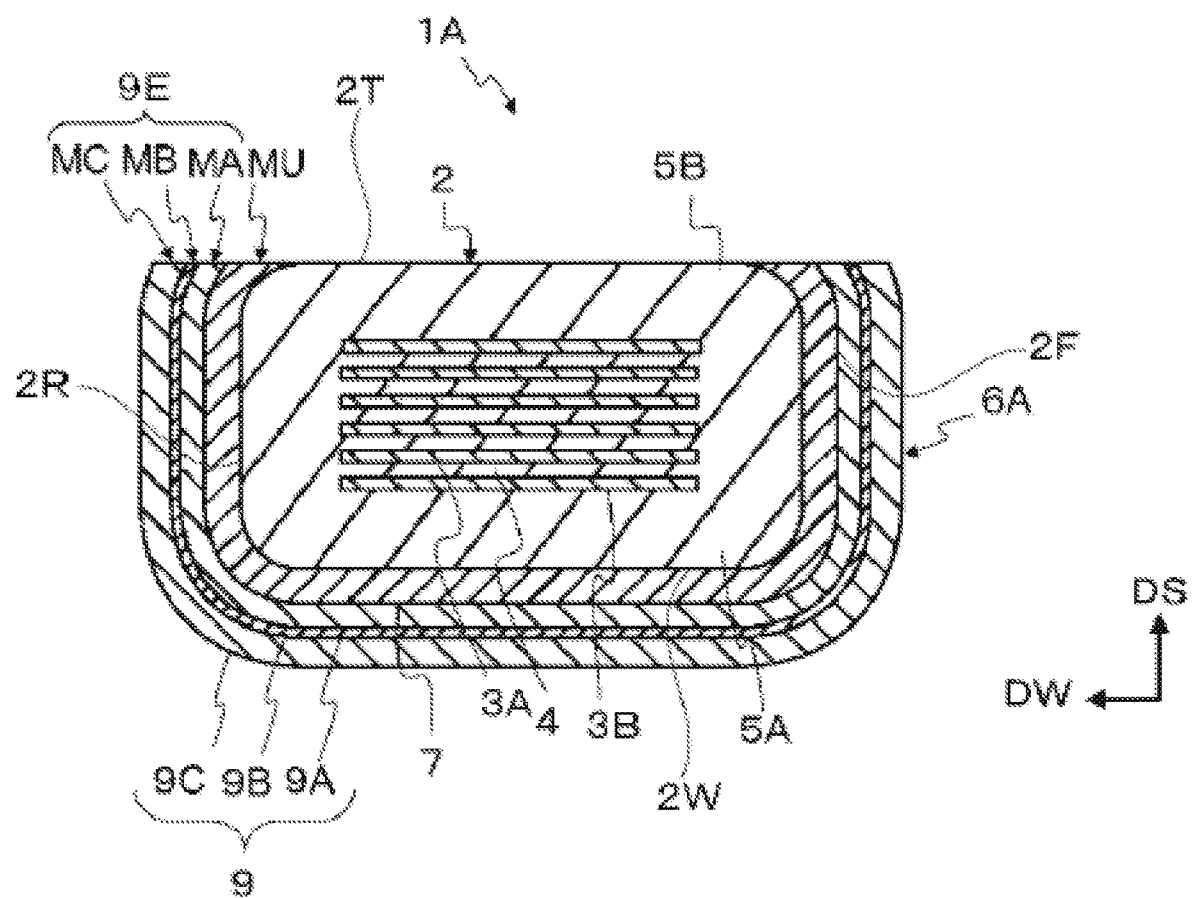
FIG. 2B shows a cross-sectional view of the multilayer ceramic capacitor of FIG. 1 cut in the width-direction at a position of an external electrode of the multilayer ceramic capacitor.
Figure 3A:
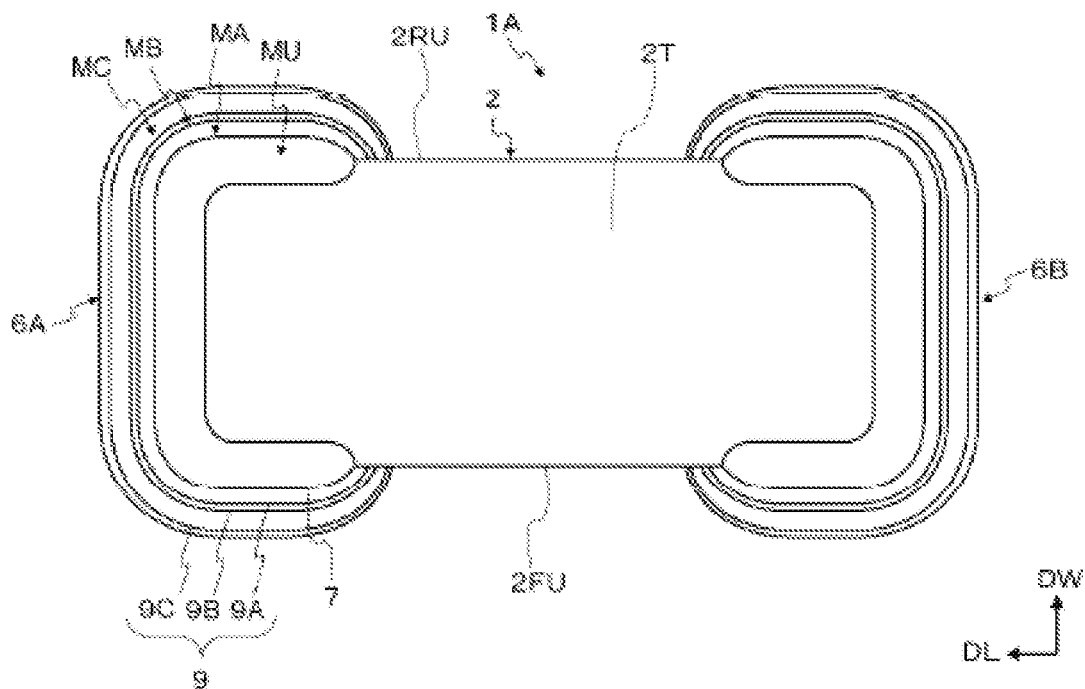
FIG. 3A is a top view of the multilayer ceramic capacitor of FIG. 1.
Figure 3B:
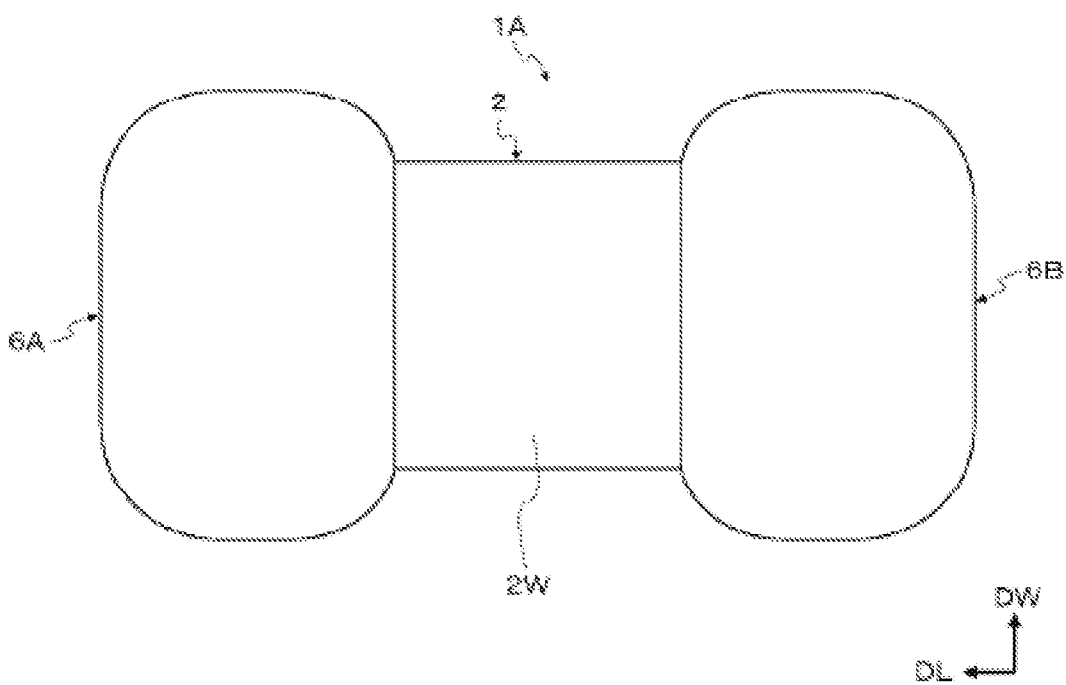
FIG. 3B is a bottom view of the multilayer ceramic capacitor of FIG. 1.

FIG. 1 is a perspective view of a multilayer ceramic capacitor 1A according to a first embodiment of the present invention. FIG. 2A is a cross-sectional view taken along the length of the multilayer ceramic capacitor of FIG. 1. An arrow DL in FIG. 1 indicates the length direction of the multilayer ceramic capacitor 1A. FIG. 2B is a cross-sectional view of the multilayer ceramic capacitor of FIG. 1 cut in the width direction at the position of an external electrode 6B. An arrow DW in FIG. 1 indicates the width direction of the multilayer ceramic capacitor 1A. FIG. 3A is a top of the multilayer ceramic capacitor 1A of FIG. 1. FIG. 3B is a bottom view of the multilayer ceramic capacitor 1A of FIG. 1. In the first embodiment, the multilayer ceramic capacitor 1A will be described an example of a ceramic electronic component. An arrow DS in FIG. 1 indicates the height direction of the multilayer ceramic capacitor 1A.

As shown in FIG. 1, FIG. 2A, FIG. 2B, FIG. 3A and FIG. 3B, the multilayer ceramic capacitor 1A includes an element body 2 and two external electrodes 6A and 6B. The element body 2 includes a laminate 2A, a lower cover layer 5A, and an upper cover layer 5B. The laminate 2A has inner electrode layers 3A and 3B and dielectric layers 4. Each of the external electrodes 6A and 6B has an underlayer (base layer) 7 between itself and the element body 2.

The lower cover layer 5A is provided under the laminate 2A and the upper cover layer 5B is provided on top of the laminate 2A. The inner electrode layers 3A and 3B are alternately laminated via the dielectric layers 4 in the height direction DS. It should be noted that although FIG. 1, FIG. 2A, and FIG. 2B show a configuration in which six internal electrode layers 3A and 3B are stacked, the number of stacked internal electrode layers 3A and 3B is limited to six. The shape of the element body 2 is a generally rectangular parallelepiped shape. Also, the shape of the laminate 2A is a generally rectangular parallelepiped shape. The element body 2 has six surfaces, i.e., a top surface 2T, a bottom surface 2W, a front surface 2F, a rear surface 2R, a right side surface 2Q, and a left side surface 2P. The two opposite surfaces of the element body 2 in the longitudinal direction DL are the right side surface 2Q and the left side surface 2P. The two opposite surface of the element body 2 in the width direction DW are the front surface 2F and the rear surface 2R. The two opposite surfaces of the element body 2 in the height direction (stacking direction) DS are the top surface 2T and the bottom surface 2W. The two side surfaces 2P and 2Q of the element body 2 may be referred to as third surfaces. The side surfaces 2P and 2Q are perpendicular to the remaining four surfaces 2T, 2W, 2F and 2R of the element body 2. The side surfaces 2P and 2Q are connected to the four surfaces 2T, 2W, 2F and 2R. The lower surface 2W may be referred to as a first surface, the upper surface 2T may be referred to as a second surface, the front surface 2F may be referred to as a fourth surface, and the rear surface 2R may be referred to as a fifth surface. The bottom surface 2W of the element body 2 may face a mounting surface of a substrate on which the multilayer ceramic capacitor 1A is mounted. Solder may be used when the multilayer ceramic capacitor 1A is mounted on the substrate.

The element body 2 is chamfered along twelve ridges of the element body 2. A curved surface R is formed along each of the twelve ridges of the element body 2. The radius of curvature C of the curved surface R is preferably between 5 μm and 20 μm, and more preferably between 10 μm and 20 μm. Incidentally, the radius of curvature C may be defined by the radius of curvature C of the curved surface R of the corner portion of the cross section of the element body 2 when the element body 2 is cut perpendicularly along the length direction DL, as shown in FIG. 2A.

If the radius of curvature C of the curved surface R of the element body 2 is 10 μm or more, it is possible to increase an amount of wrapping of the underlayer 7 on each of the side surfaces 2P and 2Q of the element body 2 from the bottom face 2W along the curved surface R. Thus, it is possible to enhance the adhesion between element body 2 and each of the base layers 7. It is also possible to keep a distance between an upper end of each underlayer 7 on the edge of the top face 2T of the element body 2 and the solder used for mounting the multilayer ceramic capacitor 1A on the substrate. Therefore, it is possible to suppress or prevent the peeling of the underlayers 7 from the element body 2, which would otherwise be caused by a shrinkage stress of the solder used for mounting the multilayer ceramic capacitor 1A on the substrate.

If the radius of curvature C of the curved surface R of the element body 2 is 20 μm or less, it is possible to reduce damages to the inner electrode layers 3A and 3B during barrel polishing of the curved surfaces R of the element body 2.

Surface roughness Sa of the upper surface 2T of the element body 2 is smaller than the surface roughness Sa of the lower surface 2W of the element body 2. The surface roughness Sa of the upper surface 2T of the element body 2 is preferably 0.20 μm or less. For example, the average surface roughness Sa of the lower surface 2W of the element body 2 may be greater than 0.50 μm, and the average surface roughness Sa of the upper surface 2T of the element body 2 may be smaller than 0.20 μm. By setting the surface roughness Sa of the upper surface 2T of the element body 2 to 0.20 μm or less, it is possible to make the upper surface 2T of the element body 2 less susceptible to scratches even when the upper surface 2T of the element body 2 is polished. Accordingly, it is possible to reduce or avoid cracking of the element body 2 that would start from scratches.

The external electrodes 6A and 6B are formed on the element body 2 and separated from each other in the longitudinal direction DL. Each of the external electrodes 6A and 6B extends to the side surface 2P, 2Q from the lower surface 2W over the curved surface R of the element body 2, but does not extend onto the upper surface 2T of the element body 2. The external electrodes 6A and 6B may also be formed on the front surface 2F and the rear surface 2R of the element body 2. The thickness of each of the external electrodes 6A and 6B is, for example, between 10 μm and 40 μm.

Because the external electrodes 6A and 6B do not extend onto the upper surface 2T of the element body 2, it is possible to reduce the height of the multilayer ceramic capacitor 1A without reducing the number of the inner electrode layers 3A and 3B stacked in the height direction DS. Thus, it is possible to achieve an LSC structure without reducing the capacitance of the multilayer ceramic capacitor 1A.

In the length direction DL of the element body 2, the internal electrode layers 3A and 3B are alternately arranged at different positions in the laminate 2A. Specifically, when compared to the internal electrode layers 3B, the internal electrode layers 3A are arranged on the left side of the element body 2, i.e., the internal electrode layers 3A extend in the length direction DL from the left side surface 2P of the element body toward the right side surface 2Q. The internal electrode layers 3B are arranged on the right side of the element body 2, i.e., the internal electrode layer 3B extend in the length direction DL from the right side surface 2Q toward the left side surface 2P. The left end of each of the internal electrode layers 3A is exposed at the left side surface 2P of the element body 2 and is connected to the external electrode 6A. The right end of each of the internal electrode layers 3B is exposed at the right side surface 2Q of the element body 2 and is connected to the external electrode 6B.

In the width direction DW of the element body 2, the ends of the inner electrode layers 3A and 3B are covered with the dielectric layers 4. In the width direction DW, the ends of the inner electrode layers 3A and 3B may be aligned with each other as shown in FIG. 2B.

The thickness of each of the internal electrode layers 3A and 3B and dielectric layers 4 in the stacking direction DS may be within the range from 0.05 μm to 5 μm, respectively. For example, the thickness of the internal electrode layer 3A is 0.3 μm, the thickness of the internal electrode layer 3B is 0.3 μm, and the thickness of the dielectric layer 4 is 0.3 μm. The material of the inner electrode layers 3A and 3B may be, for example, a metal such as Cu (copper), Ni (nickel), Ti (titanium), Ag (silver), Au (gold), Pt (platinum), Pd (palladium), Ta (tantalum) or W (tungsten), or may be an alloy containing these metals.

The main component of the material of the dielectric layer 4 may be, for example, a ceramic material that has a perovskite structure. The main component may be contained 50 at % or more. The ceramic material of the dielectric layer 4 may be, for example, barium titanate, strontium titanate, calcium titanate, magnesium titanate, strontium barium titanate, calcium barium titanate, calcium zirconate, barium zirconate, calcium zirconate titanate or titanium oxide.

The main component of the material of each of the lower cover layer 5A and the upper cover layer 5B may be, for example, a ceramic material. The main component (i.e., the ceramic material) of each of the lower cover layer 5A and the upper cover layer 5B may be the same as the main component (i.e., the ceramic material) of the dielectric layer 4. The thickness TA of the lower cover layer 5A is preferably in the range from 5 μm to 30 μm, and the thickness TB of the upper cover layer 5B is preferably in the range from 5 μm to 30 μm.

Each of the external electrodes 6A and 6B has a base layer 7 formed on the element body 2 and a plating layer 9 formed on the base layer 7. The base layers 7 are formed on the left side and the right side of the element body 2 so that they are separated from each other in the length direction DL. Specifically, the left base layer 7 is formed in the left area on the bottom surface 2W of the element body 2 and extends over the left curved surface R and the left side surface 2P of the element body 2. The left base layer 7 does not reach the top surface 2T of the element body 2. Similarly, the right base layer 7 is formed in the right area on the bottom surface 2W of the element body 2 and extends over the right curved surface R and the right side surface 2Q of the element body 2. The right base layer 7 does not reach the top surface 2T of the element body 2. The right base layer 7 has the same configuration as the left base layer 7. It should be noted that each of the base layers 7 may also extend to the front surface 2F and/or the rear surface 2R of the element body 2 from the bottom surface 2W. The thickness D1 of the base layer 7 is preferably between 3 μm and 6 μm. When the thickness D1 of the base layer 7 is 3 μm or more, it is possible to form the base layer 7 that continuously extends from the bottom surface 2W to the side surface 2P, 2Q of the element body 2 while the base layer 7 is closely contacting the curved surface R of the element body 2. By setting the thickness D1 of the base layer 7 to 6 μm or less, it is possible to suppress the increase in the thickness of each of the external electrodes 6A and 6B, and achieve the low profile (reduced height) of the multiplayer ceramic capacitor 1A.

The main component of the metal used as the conductive material of the base layer 7 may contain at least one of, for example, Cu, Fe (iron), Zn (zinc), Al (aluminum), Ni, Pt, Pd, Ag, Au and Sn (tin) or may contain an alloy that includes at least one of these metals. The base layer 7 may include a co-material which is mixed with the metal(s) of the base layer. The co-material may be present in the form of a plurality of islands in the base layer 7. If the co-material is present in the base layer 7 in the form of the islands, the co-material can reduce the difference in the thermal expansion coefficient between the element body 2 and the base layer 7, and can alleviate the stress on the base layer 7. The co-material is, for example, the ceramic component, which is the main component of the dielectric layer 4. The base layer 7 may contain a glass component. If the glass component is mixed in the base layer 7, the glass component can densify the base layer 7. This glass component is, for example, an oxide of Ba (barium), Sr (strontium), Ca (calcium), Zn, Al, Si (silicon) or B (boron).

The base layer 7 may contain a metal component that is included in the element body 2. This metal component is, for example, Mg, and a trace amount of Ni, Cr, Sr, Al, Na and/or Fe may be included in this metal component. The base layer 7 may include, for example, a compound containing Mg, Ni and O as a compound of the metal used as the conductive material of the base layer 7, the metal contained in the element body 2 and oxygen.

The base layer 7 is preferably composed of a sintered coating film containing a dielectric material. This makes it possible to make the base layer 7 thicker while ensuring adhesion between the element body 2 and the base layer 7, and to ensure conductivity with the internal electrode layers 3A and 3B while maintaining proper strength of the external electrodes 6A and 6B. Incidentally, for the purpose of electrode area expansion to enhance the adhesion between the electrode(s) and the conductive material such as solder at the time of mounting the multiplayer ceramic capacitor 1A on the substrate, the underlayer 7 may have a sputtered film, which is formed by a sputtering method on the sintered coating film on the lower surface. In this configuration, the sputtered film does not contain a metal component contained in the element body 2, and can be formed of a metal such as Cu or Ni or an alloy thereof. Alternatively, the underlayer 7 may be formed of only a sputtered film for the purpose of thinning.

The plating layer 9 is formed for each of the external electrodes 6A and 6B such that the plating layer 9 covers the associated base layer 7. The plating layer 9 is not formed on the top surface 2T of the element body 2. The left plating layer 9 is conductive with the inner electrode layer 3A through the left underlayer 7, and the right plating layer 9 is conductive with the inner electrode layer 3B through the right underlayer 7. The plating layers 9 are conducted to terminals of the mounting substrate through the solder. To ensure the strength of the external electrodes 6A and 6B and to ensure the reliability of the conduction between the underlayers 7 and the plating layers 9 and conduction between the terminals of the mounting substrate and the plating layers 9, the thickness of each of the plating layers 9 is preferably 10 μm or more.

The main component of the material of the plating layer 9 may be a metal such as Cu, Ni, Al, Zn or Sn, or an alloy made from two or more of these metals. The plating layer 9 may have a single-layer structure that includes a single metal component or a multi-layer structure that includes a plurality of plating layers (sub-plating layers) of different metal components. For example, the plating layer 9 has a three-layer structure consisting of a Cu plating layer 9A formed on the base layer 7, a Ni plating layer 9B formed on the Cu plating layer 9A, and a Sn plating layer 9C formed on the Ni plating layer 9B. The Cu plating layer 9A can enhance the adhesiveness of the plating layer 9 to the base layer 7. The Ni plating layer 9B can increase the thermal resistance of the external electrode 6A, 6B during soldering. The Sn plating layer 9C can improve the wettability of the solder to the plating layer 9. If the thickness of the underlayer 7 is 4.5 μm, the thickness of the Cu plating layer 9A may be 3 μm, the thickness of the Ni plating layer 9B may be 2 μm, and the thickness of the Sn plating layer 9C may be 6 μm. Each of the Cu plating layer 9A, the Ni plating layer 9B, and the Sn plating layer 9C may be referred to as a sub-plating layer of the plating layer 9 (or sub-layer of the plating layer 9).

When the upper surface 2T of the element body 2 is looked at, an upper end face (first end face) MU of the underlayer 7 and an upper end face (second end face) 9E of the plating layer 9 form a multilayer structure outside the element body 2. The upper end face 9E of the plating layer 9 includes an upper end face MA of the Cu plating layer 9A, an upper end face MB of the Ni plating layer 9B, and an upper end face MC of the Sn plating layer 9C. The upper end face 9E (or the upper end face MA) of the plating layer 9 is in contact with the upper end face MU of the underlayer 7. In the configuration shown in FIG. 2A, the upper end face MU of the underlayer 7, the upper end face MA of the Cu plating layer 9A, the upper end face MB of the Ni plating layer 9B, and the upper end face MC of the Sn plating layer 9C are level to the upper surface 2T of the element body 2. The upper end face MU of the underlayer 7 is in contact with the upper surface 2T of the element body 2. The upper end face MA of the Cu plating layer 9A is situated outside the end face MU of the underlayer 7. The upper end face MB of the Ni plating layer 9B is situated outside the upper end face MA of the Cu plating layer 9A. The upper end face MC of the Sn plating layer 9C is situated outside the upper end face MB of the Ni plating layer 9B.

The end faces MU, MA, MB and MC are coplanar with the upper surface 2T of the element body 2. The normal direction of each of the end faces MU, MA, MB, and MC and the normal direction of the upper surface 2T of the element body 2 are parallel to each other. Each of the end faces MU, MA, MB, and MC may be a flat surface.

Each of the underlayers 7 extends upward along the side surface 2P, 2Q of the element body 2 and the end face MU of the underlayer 7 slightly bends inward along the curved surface R of the upper surface 2T of the element body 2 such that the end face MU of the underlayer 7 becomes level to the upper surface 2T of the element body 2. An amount of bending of the upper portion of the underlayer 7 may be equal to the radius of curvature C of the curved surface R of the element body 2. As shown in the FIG. 3A, each of the underlayers 7 may wrap around the upper ridge 2FU of the front surface 2F and the upper ridge 2RU of the rear surface 2R of the element body 2. An amount of wrapping may be altered based on the size of the radius of curvature C of the curved surface R and/or the thickness of each layer of the outer electrode 6A, 6B. Each of the Cu plating layer 9A, the Ni plating layer 9B and the Sn plating layer 9C extends over the associated underlayer 7 and reaches the front surface 2F and the rear surface 2R of the element body 2 such that the end face MA of the Cu plating layer 9A, the end face MB of the Ni plating layer 9B and the end face MC of the Sn plating layer 9C reach the upper ridges 2FU and 2RU of the element body 2, respectively. It should be noted that the Sn plating layer 9C may expand outwardly of the element body 2 such that the size of the end face MC of the Sn plating layer 9C in the length direction DL may become larger than the size shown in FIG. 1 or FIG. 2A. In this configuration, the Sn plating layer 9C may be able to suppress the wetting up of the solder onto the element body 2 at the time of mounting the capacitor 1A on the substrate, depending on the amount of outward expansion of the Sn plating layer 9C from the element body 2.

The upper end MU of the underlayer 7 is exposed and is not covered with the Cu plating layer 9A, the Ni plating layer 9B and Sn plating layer 9C. Accordingly, the layered structure of each of the external electrodes 6A and 6B is exposed outside the multilayer ceramic capacitor 1A. On the other hand, the lower end portion 7U of the underlayer 7 is covered with the Cu plating layer 9A, the Ni plating layer 9B and the Sn plating layer 9C on the lower surface 2W of the element body 2.

As described above, the upper surface 2T of the element body 2 is coplanar with the upper end face MU of the underlayer 7, the upper end face MA of the Cu plating layer 9A, the upper end face MB of the Ni plating layer 9B and the upper end face MC of the Sn plating layer 9C. Thus, it is possible to produce the multilayer ceramic capacitor 1A having no external electrodes 6A and 6B on the upper surface 2T of the element body 2, without breakage of the external electrodes 6A and 6B. Accordingly, it is possible to reduce the height of the multilayer ceramic capacitor 1A while suppressing or avoiding a decrease in the transverse rupture strength of the multilayer ceramic capacitor 1A. It is also possible for each of the external electrodes 6A and 6B to have a desired cross-sectional shape when viewed from the top of the element body 2. Further, it is possible to suppress a decrease in adhesion between the external electrode 6A and the element body 2 and between the external electrode 6B and the element body 2. If the multilayer ceramic capacitor 1A experiences breakage of the external electrodes 6A and 6B, the plating protrudes in the height direction from the fractured surfaces of the external electrodes 6A and 6B, respectively. In the configuration shown in FIG. 1 to FIG. 3A, however, the multilayer ceramic capacitor 1A does not experience breakage of the external electrodes 6A and 6B, and therefore the multilayer ceramic capacitor 1A can have a low profile.

Because the upper face 2T of the element body 2 is coplanar with the upper end face MU of the underlayer 7, the upper end face MA of the Cu plating layer 9A, the upper end face MB of the Ni plating layer 9B and the upper end face MC of the Sn plating layer 9C, respectively, each of the Cu plating layer 9A, the Ni plating layer 9B and the Sn plating layer 9C can maintain its thickness unchanged from the side surface 2P, 2Q up to the upper surface 2T of the element body 2. Therefore, it is possible to suppress a decrease in the strength of the external electrode 6A, 6B. It is also possible to suppress a decrease in the conductivity between the external electrode 6A, 6B and the underlayer 7 and between the external electrode 6A, 6B and terminals of the mounting substrate.

Because the upper face 2T of the element body 2 is coplanar with the upper end face MU of the underlayer 7, the upper end face MA of the Cu plating layer 9A, the upper end face MB of the Ni plating layer 9B and the upper end face MC of the Sn plating layer 9C, respectively, the entire upper surface of the multilayer ceramic capacitor 1A can be flat. Therefore, it is possible to eliminate the irregularities on the upper surface of the multilayer ceramic capacitor 1A. This contributes to stabilization of the attitude (posture) of the multilayer ceramic capacitor 1A when a suction nozzle of a mounter contacts and sucks the top surface of the multilayer ceramic capacitor 1A during picking up of the multilayer ceramic capacitor 1A. This, in turn, contributes to reduction of errors when the multilayer ceramic capacitor 1A is mounted on the substrate.

Because each of the underlayers 7 bends along the curved surface R in the vicinity of the upper surface 2T of the element body 2, it is possible to enhance the adhesion between the underlayer 7 and the element body 2. It is also possible keep a distance between the upper end of the underlayer 7 (i.e., interface between the upper end face MU and the top surface 2T) and the solder used to mount the multilayer ceramic capacitor 1A on the substrate. Therefore, it is possible to avoid the peeling of the underlayer 7 from the element body 2 due to the shrinkage stress of the solder used to mount the multilayer ceramic capacitor 1A on the substrate.

The outer size of the multilayer ceramic capacitor 1A may satisfy a condition of length>width>height H, or a condition of length>width=height H. In order for the multilayer ceramic capacitor 1A to have a reduced height, the height H of the multilayer ceramic capacitor 1A is preferably 150 micrometers or less. The height H of the multilayer ceramic capacitor 1A is the thickness of the multilayer ceramic capacitor 1A and defined by the distance between the lower surface 6AU of the outer electrode 6A (or the lower surface 6BU of the outer electrode 6B) and the upper surface 2T of the element body 2.

Figure 7:
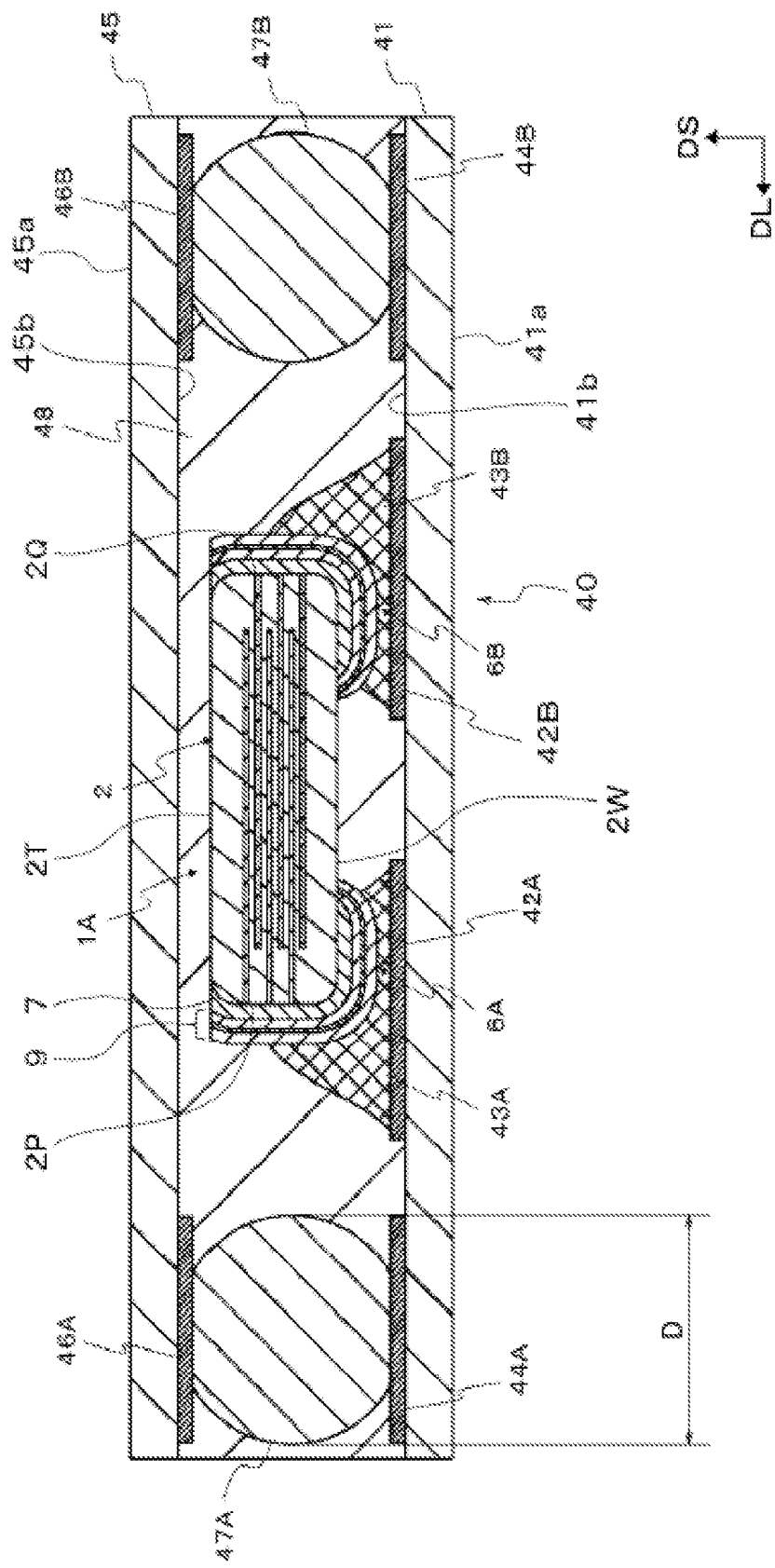
FIG. 7 is a cross-sectional view showing an exemplary configuration of a substrate arrangement, in which a multilayer ceramic capacitor is mounted on a substrate, according to a second embodiment of the present invention.

If the height H of the multilayer ceramic capacitor 1A is 150 micrometers or less, the height H of the multilayer ceramic capacitor 1A can be smaller than the diameter D (FIG. 7) of the solder balls of the mounting substrate 41 (FIG. 7). Therefore, while mounting the multilayer ceramic capacitor 1A on an upper surface of the mounting substrate and forming the solder balls formed on the same surface of the mounting substrate, it is possible to mount the mounting substrate on the motherboard via the solder balls. Consequently, it is possible to place the multilayer ceramic capacitor 1A on the upper surface of the mounting substrate and place a semiconductor chip on a lower surface (opposite surface) of the mounting substrate. As a result, it is possible to mount the multilayer ceramic capacitor 1A in close proximity to the semiconductor chip, and increase the mounting area on the lower surface of the mounting substrate. Therefore, while increasing the mounting density of the semiconductor chips on the lower surface of the mounting substrate, it is possible to effectively eliminate noises applied to the semiconductor chip.

For example, when the thickness of each of the external electrodes 6A and 6B is 15 µm, it is assumed that 80 µm is requested as the height H of the multilayer ceramic capacitor 1A. In this case, the thickness of the element body 2 can be between 50 µm and 65 µm. If 60 µm is required as the height H of the multilayer ceramic capacitor 1A, the thickness of the element body 2 can be between 30 µm and 45 µm. Such configurations achieve the low profile of the multilayer ceramic capacitor 1A, and suppress a decrease in the transverse rupture strength of the multilayer ceramic capacitor 1A. Thus, it is possible to improve the resistance to impacts upon mounting the multilayer ceramic capacitor 1A on the substrate and various stresses which may be encountered after the mounting of the multilayer ceramic capacitor 1A on the substrate.

Figure 4:
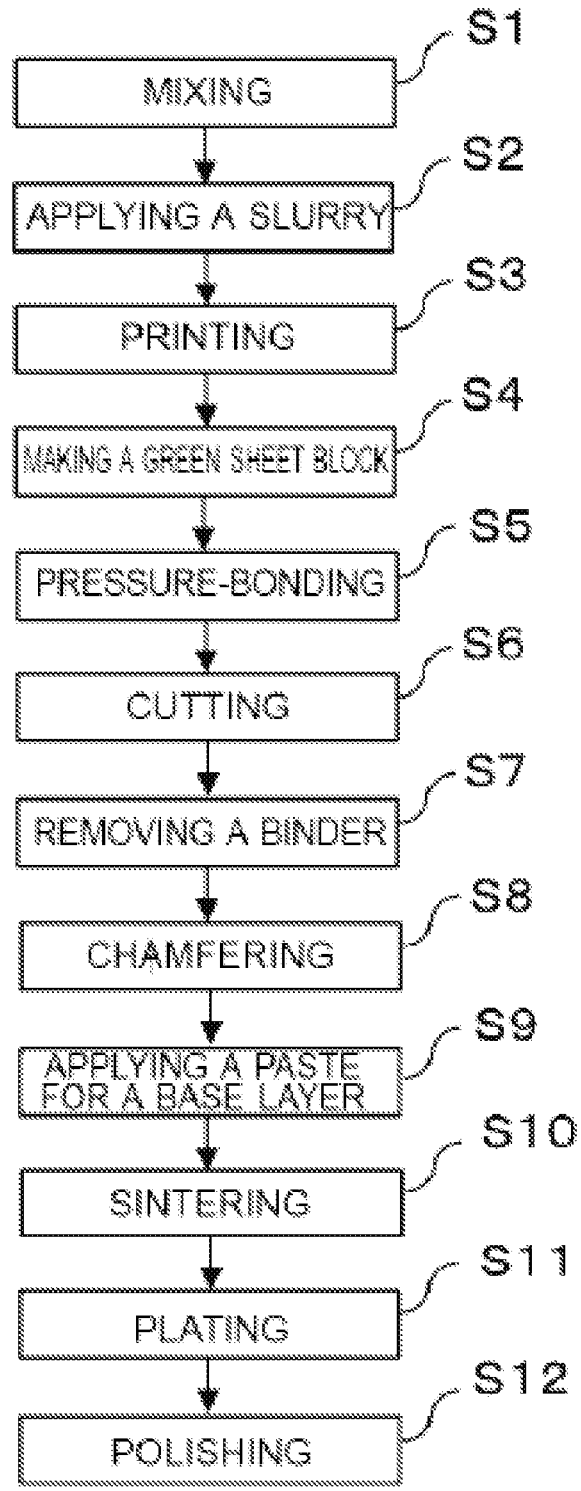
FIG. 4 is a flowchart showing a method of manufacturing the multilayer ceramic capacitor according to the first embodiment.

FIG. 4 is a flowchart showing a method of manufacturing the multilayer ceramic capacitor 1A according to the first embodiment. FIG. 5A to FIG. 5J is a series of cross-sectional views useful to describe the method of manufacturing a multilayer ceramic capacitor 1A. It should be noted that for the sake of description and understanding, the three inner electrode layers 3A and the three inner electrode layers 3B are alternately stacked in the thickness direction DS of the capacitor 1A, with the dielectric layers 4 being interposed between the inner electrode layers 3A and 3B.

In Step S1 of FIG. 4, an organic binder, an organic solvent as a dispersant, and a forming aid are added to a dielectric material powder, and pulverized and mixed to produce a muddy slurry. The dielectric material powder includes, for example, a ceramic powder. The dielectric material powder may contain an additive or additives. The additive(s) may be, for example, an oxide of Mg, Mn, V, Cr, Y, Sm, Eu, Gd, Tb, Dy, Ho, Er, Tm, Yb, Co, Ni, Li, B, Na, K or Si, or glass.

The organic binder is, for example, polyvinyl butyral resin or polyvinyl acetal resin. The organic solvent is, for example, ethanol or toluene.

Figure 5A:
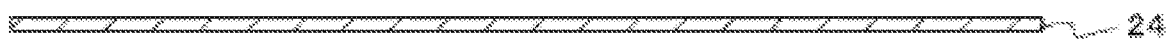
FIG. 5A is a cross-sectional view showing the method of manufacturing the multilayer ceramic capacitor according to the first embodiment.

Next, as indicated in Step S2 of FIG. 4 and shown in FIG. 5A, a green sheet 24 is prepared. Specifically, the slurry containing the ceramic powder is applied onto a carrier film in a sheet form and dried to manufacture the green sheet 24. The carrier film is, for example, a PET (polyethylene terephthalate) film. A doctor blade method, a die coater method or a gravure coater method may be used to apply the slurry onto the carrier film. Step S2 is repeated to prepare a plurality of green sheets 24.

Figure 5B:
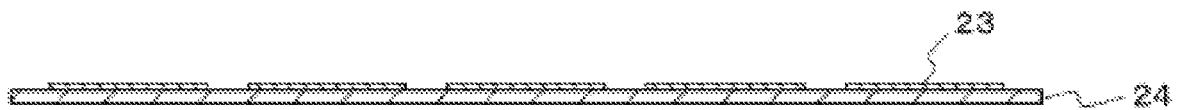
FIG. 5B is another cross-sectional view showing the method of manufacturing the multilayer ceramic capacitor according to the first embodiment.

Next, as indicated in Step S3 of FIG. 4 and shown in FIG. 5B, a conductive paste, which will become the internal electrode, is applied in a predetermined pattern onto each of those green sheets 24, which will form the internal electrode layers 3A and 3B, among the green sheets prepared in Step S1 to form a plurality of internal electrode patterns 23 on that green sheet 24. In Step 3, it is possible to form a plurality of internal electrode patterns 23 on the single green sheet 24 such that the internal electrode patterns 23 are separated from each other in the longitudinal direction of the green sheet 24. The conductive paste for the internal electrode includes a powder of the metal used as the material of the internal electrode layers 3A and 3B. For example, if the metal used as the material of the internal electrode layers 3A and 3B is Ni, the conductive paste for the internal electrodes contains a Ni powder. Further, the conductive paste for the internal electrodes includes a binder, a solvent, and, if necessary, an auxiliary agent. The conductive paste for the internal electrodes may contain, as a co-material, a ceramic material which is the main component of the dielectric layers 4. The application of the conductive paste for the internal electrodes may be carried out by a screen printing method, an ink jet printing method or a gravure printing method. Thus, Step S3 may be referred to as a printing step. In this manner, a plurality of green sheets 24 that have the inner electrode patterns 23 thereon are prepared.

Figure 5C:
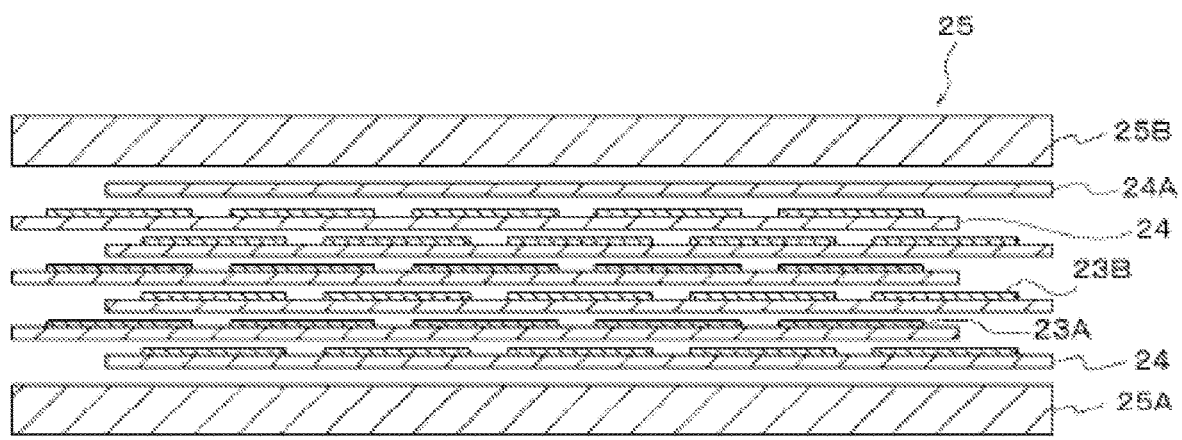
FIG. 5C is still another cross-sectional view showing the method of manufacturing the multilayer ceramic capacitor according to the first embodiment.

Next, as indicated in Step S4 of FIG. 4 and shown in FIG. 5C, the green sheets 24 on which the internal electrode patterns 23 are formed and the green sheets 24A, 25A and 25B on which the internal electrode patterns 23 are not formed are laminated in a predetermined order to create a block 25 of the green sheets 24. The green sheets 25A and 25B on which the internal electrode patterns 23 are not formed are used as outer layers (i.e., the bottom layer and the top layer). The thickness of the green sheet 25A, 25B is greater than the thickness of the green sheet 24 on which the internal electrode patterns 23 are formed. In Step S4, the green sheets 24 having the internal electrode patterns 23 thereon are divided into two groups, i.e., the green sheets 24 having the internal electrode patterns 23A thereon and the green sheets 24 having the internal electrode patterns 23B thereon. Then, the green sheets 24 having the internal electrode patterns 23A thereon and the green sheets 24 having the internal electrode patterns 23B thereon are stacked alternately in the laminating direction such that the internal electrode patterns 23A on the green sheet 24 and the internal electrode patterns 23B on the next or adjacent green sheet 24 are alternately shifted in the longitudinal direction of the green sheet 24. Further, three types of portions are defined in the green sheet block 25. Specifically, a portion where only the internal electrode patterns 23A are stacked in the stacking direction, a portion where the internal electrode patterns 23A and 23B are stacked alternately in the stacking direction, and a portion where only the internal electrode patterns 23B are stacked in the stacking direction are defined in the green sheet block 25.

Figure 5D:
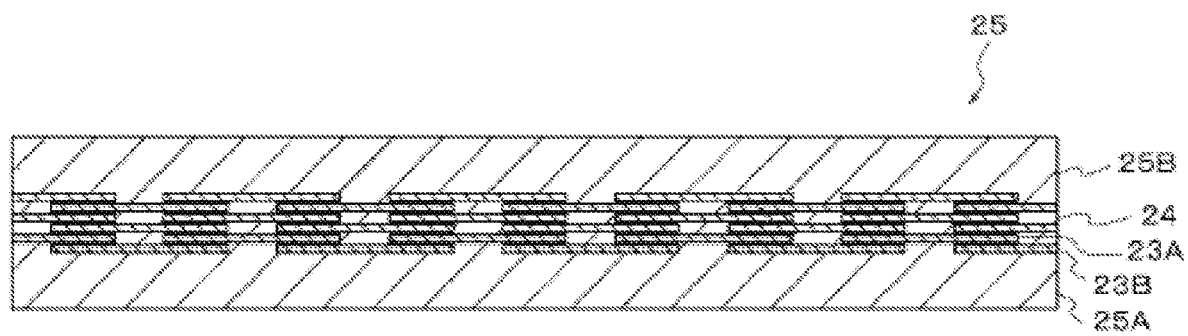
FIG. 5D is yet another cross-sectional view showing the method of manufacturing the multilayer ceramic capacitor according to the first embodiment.

Next, as indicated in Step S5 of FIG. 4 and shown in FIG. 5D, the laminate block 25 obtained in the forming process of Step S4 of FIG. 4 is pressed such that the green sheets 24, 24A, 25A and 25B are pressure-bonded. Pressing the laminate block 25 may be carried out by, for example, sandwiching the laminate block 25 between resin films, and hydrostatically pressing the laminate block 25.

Figure 5E:
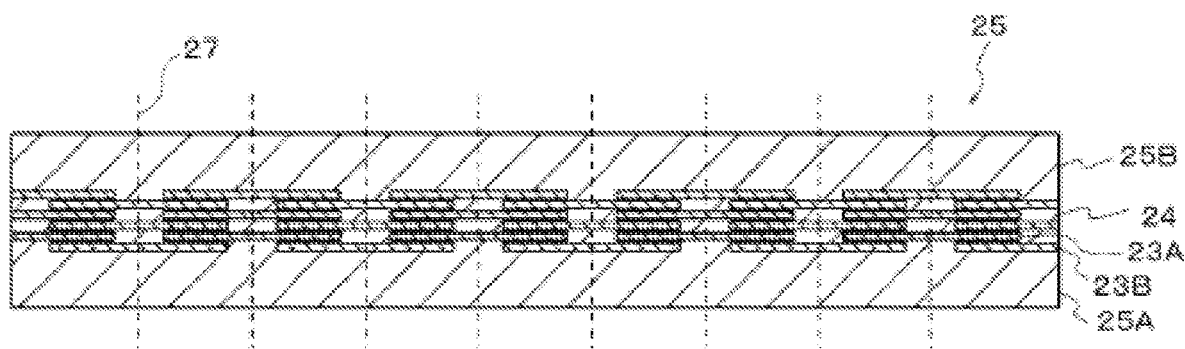
FIG. 5E is another cross-sectional view showing the method of manufacturing the multilayer ceramic capacitor according to the first embodiment.

Next, as indicated in Step S6 of FIG. 4 and shown in FIG. 5E, the pressed laminate block 25 is cut such that the block 25 is separated to a plurality of element bodies, each of which has a rectangular parallelepiped shape. Each element body has six surfaces. The cutting of the laminate block 25 is carried out at the portions where only the inner electrode patterns 23A are present in the stacking direction, and the portions where only the inner electrode patterns 23B are present in the stacking direction, as indicated by a plurality of vertical broken lines 27. The cutting of the laminate block 25 is carried out by, for example, blade dicing or a similar method. One of the resulting element bodies 2″ is shown in FIG. 5F.

Figure 5F:
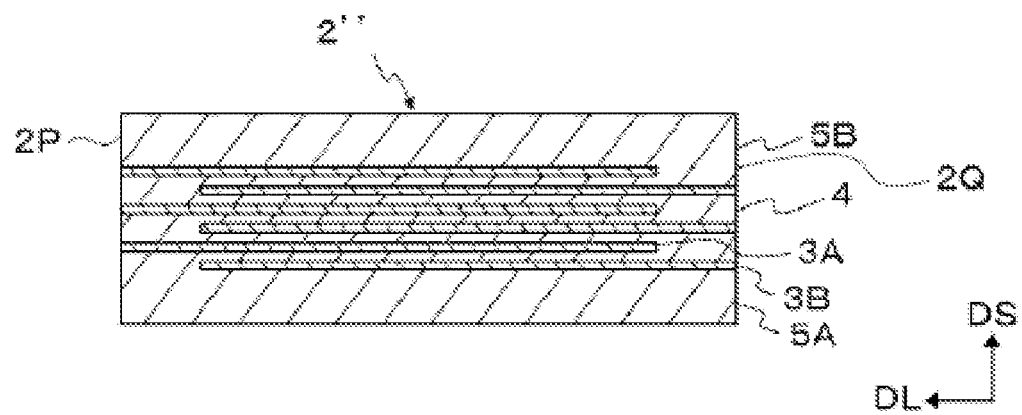
FIG. 5F is another cross-sectional view showing the method of manufacturing the multilayer ceramic capacitor according to the first embodiment.

As shown in FIG. 5F, the internal electrode layers 3A and 3B are alternately laminated via the dielectric layers 4 in each of the individual element bodies 2″, with the upper cover layer 5A becoming the top layer and the lower cover layer 5B becoming the bottom layer. The internal electrode layers 3A are exposed on the left face 2P of each element body 2″, and the internal electrode layers 3B are exposed on the right face 2Q of each element body 2″. It should be noted that in FIG. 5F the element body 2″ is shown enlarged in the length direction DL.

Next, as indicated in Step S7 of FIG. 4, the binder contained in each of the element bodies 2″ obtained in Step S6 of FIG. 4 is removed. The removal of the binder is carried out by, for example, heating the element bodies 2″ in an N2 atmosphere at about 350 degrees C.

Figure 5G:
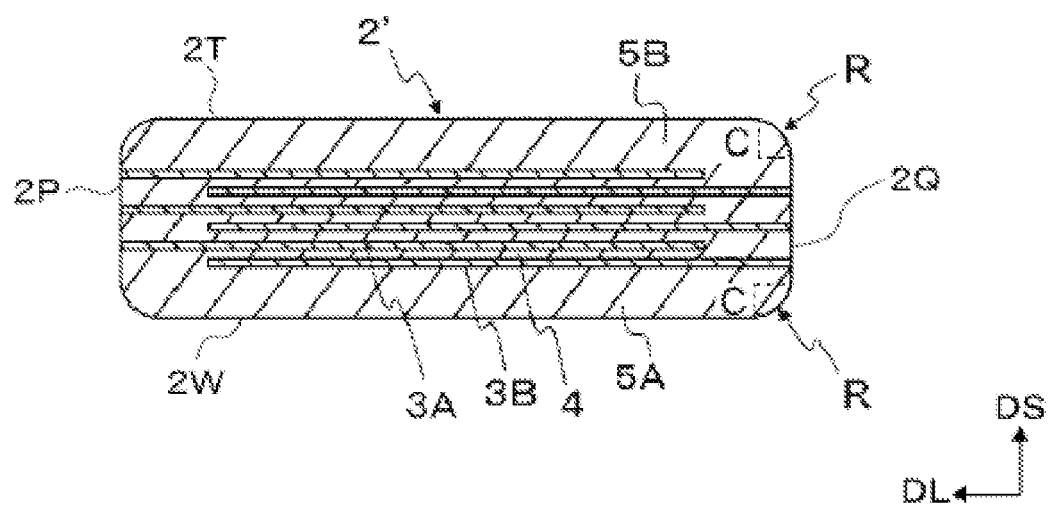
FIG. 5G is another cross-sectional view showing the method of manufacturing the multilayer ceramic capacitor according to the first embodiment.

Next, as indicated in Step S8 of FIG. 4 and shown in FIG. 5G, chamfering is performed on each of the element bodies 2″ along the four edges (ridges) that extend in the width direction DW of the element body 2″ to prepare a plurality of element bodies 2′ such that each element body 2′ has four curved surfaces R at upper and lower edges of the element body 2′ in the width direction DW. Barrel polishing may be used to chamfer each of the element bodies 2″. The radii of curvature C of the four curved surfaces R at the upper and lower edges of the element body 2′ are equal to each other. Chamfering may also be performed on along other edges of the element body that extend in the length direction DL and the height direction DS of the element body.

Next, as indicated in Step S9 of FIG. 4, a conductive paste for the base layer (underlayer) 7 is applied to the two side surfaces 2P and 2Q of each element body 2′ which has undergone the chamfering in Step S8 of FIG. 4 and to the end areas of the remaining four surfaces (top surface 2T, the bottom surface 2W, the front surface 2F and the rear surface 2R) of the element body 2′ which are in contact with the respective side surfaces 2P and 2Q. Then, the conductive paste is dried. A dipping method may be used to apply the conductive paste for the base layer 7. The conductive paste for the base layer 7 includes a powder or filler of the metal used as the conductive material of the base layer 7. For example, when the metal used as the conductive material of the base layer 7 is Ni, the conductive paste for the base layer includes a powder or filler of Ni. Further, the conductive paste for the base layer includes, as a co-material, a ceramic component, which is the main component of the dielectric layers 4, for example. Particles of oxide ceramics mainly composed of barium titanate (0.8 µm to 4 µm in D50 particle diameter), for example, are mixed in the conductive paste for the base layer, as the co-material. Further, the conductive paste for the base layer includes a binder and a solvent.

Figure 5H:
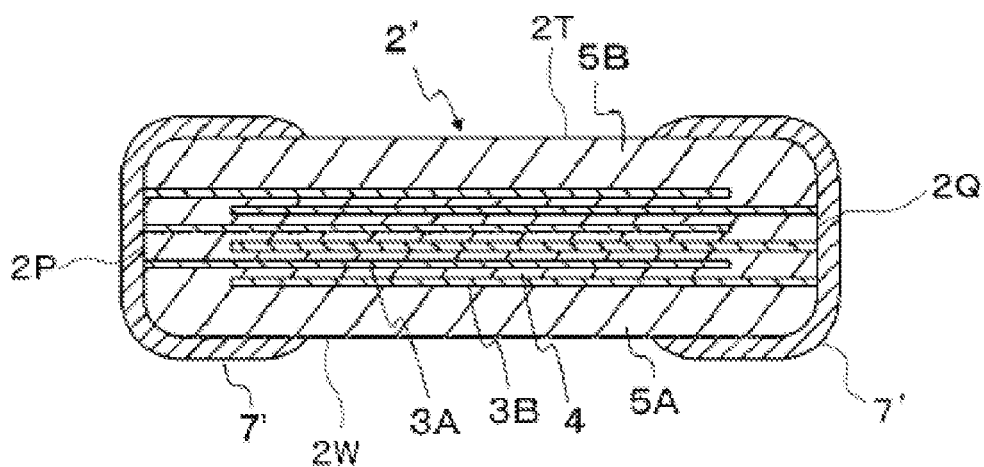
FIG. 5H is another cross-sectional view showing the method of manufacturing the multilayer ceramic capacitor according to the first embodiment.

Next, as indicated in Step S10 of FIG. 4 and shown in FIG. 5H, the element bodies 2', on which the conductive paste for the base layer is applied in Step S9 of FIG. 4, undergo the sintering process such that the inner electrode layers 3A and 3B are integrated with the dielectric layers 4 in each element body 2' and the base layers 7' are formed and integrated with the element body 2'. The sintering of the element bodies 2' and the conductive paste for the base layers is carried out in, for example, a sintering furnace in a temperature range from 1000 degrees C. to 1400 degrees C. for ten minutes to two hours. If a base metal such as Ni or Cu is used as the material of the interna electrode layers 3A and 3B, the sintering process may be carried out in the sintering furnace while the interior of the sintering furnace is kept to a reducing atmosphere in order to prevent the oxidation of the internal electrode layers 3A and 3B.

Figure 5I:
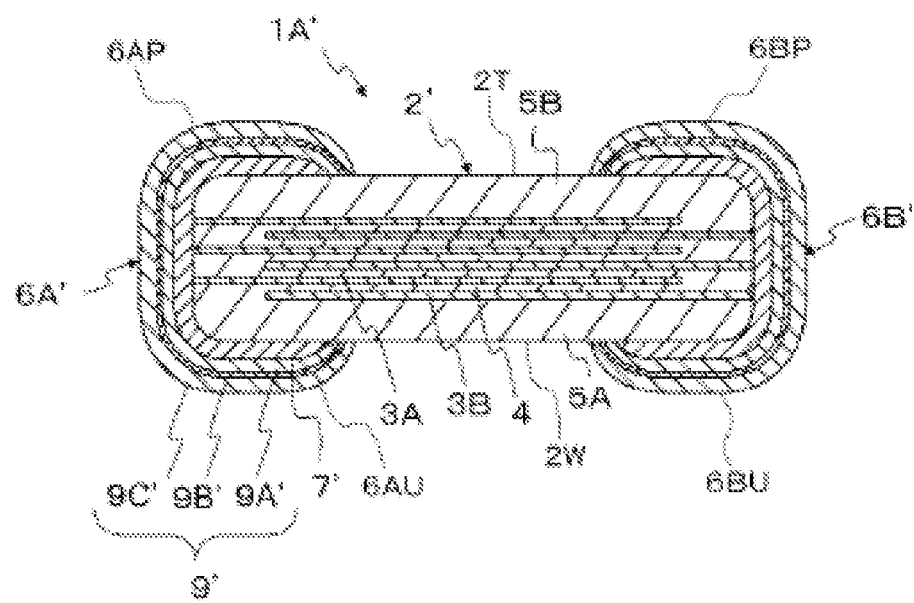
FIG. 5I is another cross-sectional view showing the method of manufacturing the multilayer ceramic capacitor according to the first embodiment.

Next, as indicated by Step S11 in FIG. 4 and shown in FIG. 5I, a Cu plating layer 9A', an Ni plating layer 9B' and an Sn plating layer 9C' are sequentially formed on each of the underlayers 7'. This makes a multilayer ceramic capacitor 1A', in which the external electrodes 6A' and 6B' are formed on certain areas of the lower surface 2W, the upper surface 2T, the front surface 2F and the rear surface 2R and on the entire areas of the right side surface 2Q and the left side surface 2P of the element body 2'. In this manner, a single plating structure 9' may be formed by the Cu plating layer 9A', the Ni plating layer 9B' and the Sn plating layer 9C'. In the plating process, the element body 2' on which the base layers 7' are formed is placed in a barrel together with a plating solution, and the electricity is supplied to the barrel while rotating the barrel, so as to form the plating layers 9'. Reference numeral 6AP denotes an upper surface of the outer electrode 6A' and reference numeral 6BP denotes an upper surface of the outer electrode 6B'. Each of the Cu plating layer 9A', the Ni plating layer 9B', and the Sn plating layer 9C' may be referred to as a sub-plating layer.

Figure 5J:
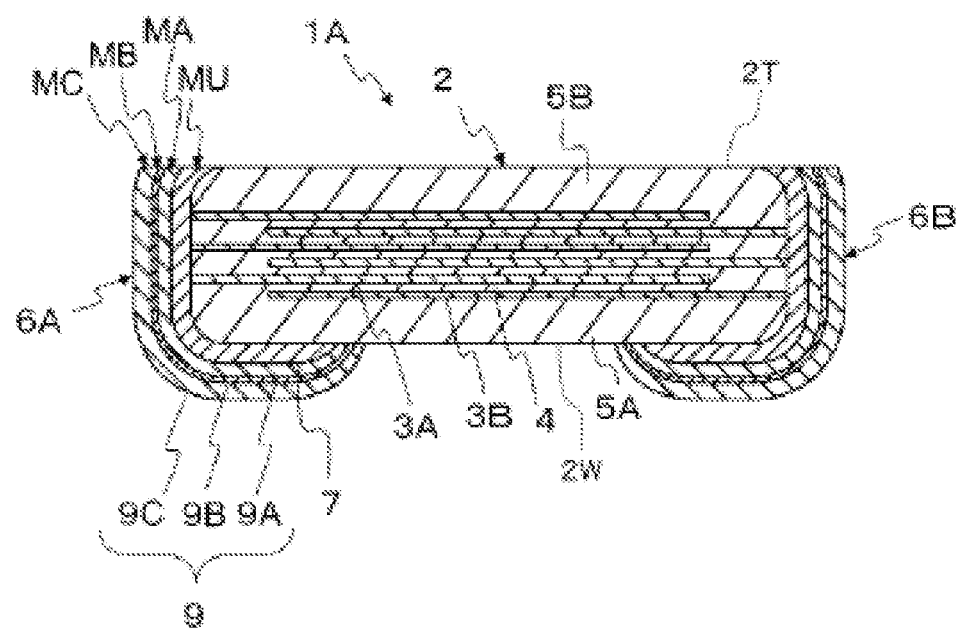
FIG. 5J is another cross-sectional view showing the method of manufacturing the multilayer ceramic capacitor according to the first embodiment.

Next, as indicated by Step S12 in FIG. 4 and shown in FIG. 5J, physical polishing is applied on the upper surface 2T of the element body 2' to remove the underlayers 7', the Cu plating layers 9A', the Ni plating layers 9B' and the Sn plating layers 9C' from the upper surface 2T of the element body 2'. As a result, the multilayer ceramic capacitor 1A having a flat top surface is fabricated as shown in FIG. 5J. The upper surface 2T of the element body 2 of the capacitor 1A has been polished, and the respective upper end surfaces of the underlayers 7, Cu plating layers 9A, Ni plating layers 9B and Sn plating layers 9C have also been polished. The surface roughness Sa of the upper surface 2T of the element body 2 may be smaller than the surface roughness Sa of the lower surface 2W of the element body 2. It should be noted that the Sn plating layers 9C may extend or expand outward of the element body 2 as compared to the configuration shown in FIG. 5J, i.e., each of the Sn plating layers 9C may have a greater thickness.

When manufacturing the multilayer ceramic capacitor 1A of FIG. 5J, it is possible to utilize the multilayer ceramic capacitor 1A' of FIG. 5I. The manufacturing process of the multilayer ceramic capacitor 1A of FIG. 5J may be performed immediately after the manufacturing process of the multilayer ceramic capacitor 1A' of FIG. 5I. Therefore, in order to produce the multilayer ceramic capacitor 1A of FIG. 5J, it is sufficient to add Step S12 of FIG. 4 to the manufacturing line of the multilayer ceramic capacitor 1A' of FIG. 5I. i.e., there is no need to modify the manufacturing line of the multilayer ceramic capacitor 1A' of FIG. 5I.

The above-described manufacturing method can increase the thickness of each of the element bodies 2, 2' and 2" while reducing the height H of the multilayer ceramic capacitor 1A. Therefore, it is possible to avoid difficult handling of the element bodies 2, 2' and 2" during the manufacturing, and achieve reliable manufacturing of the multilayer ceramic capacitor 1A.

Figure 6A:
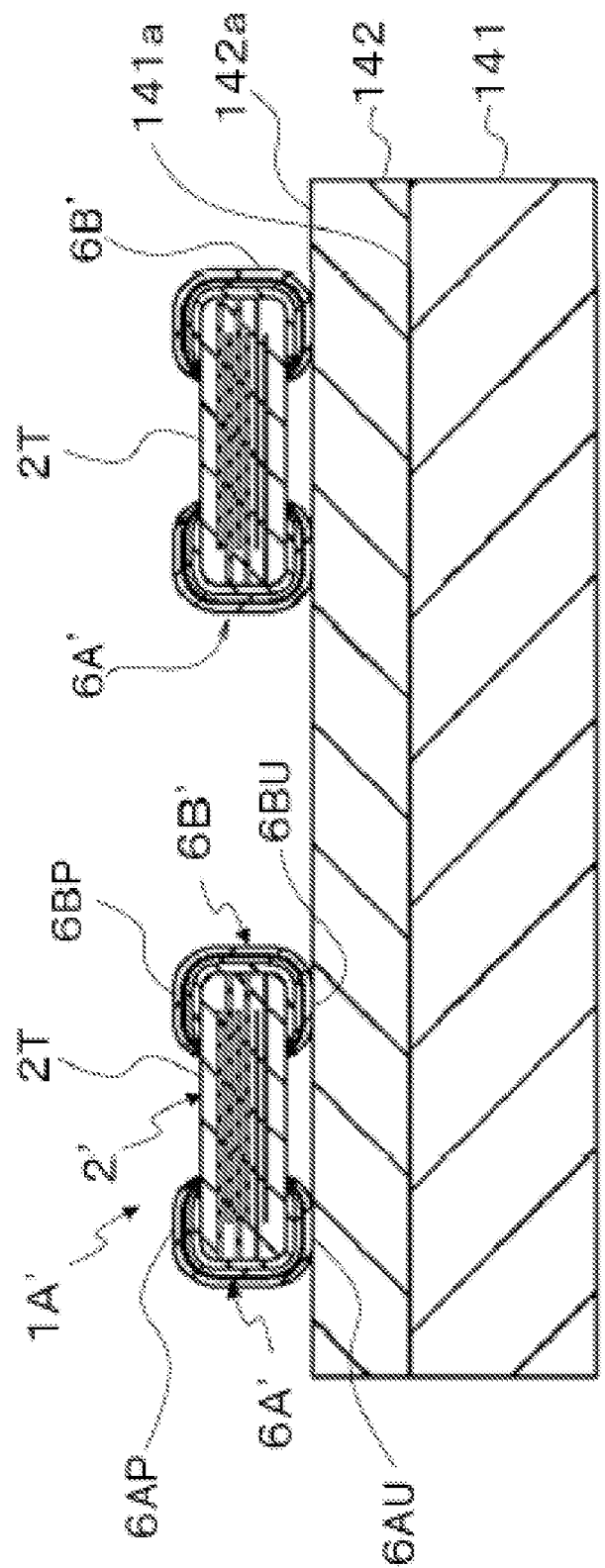
FIG. 6A is a cross-sectional view showing an exemplary process of removing outer electrodes from an upper surface of an element body of the multilayer ceramic capacitor according to the first embodiment.
Figure 6C:
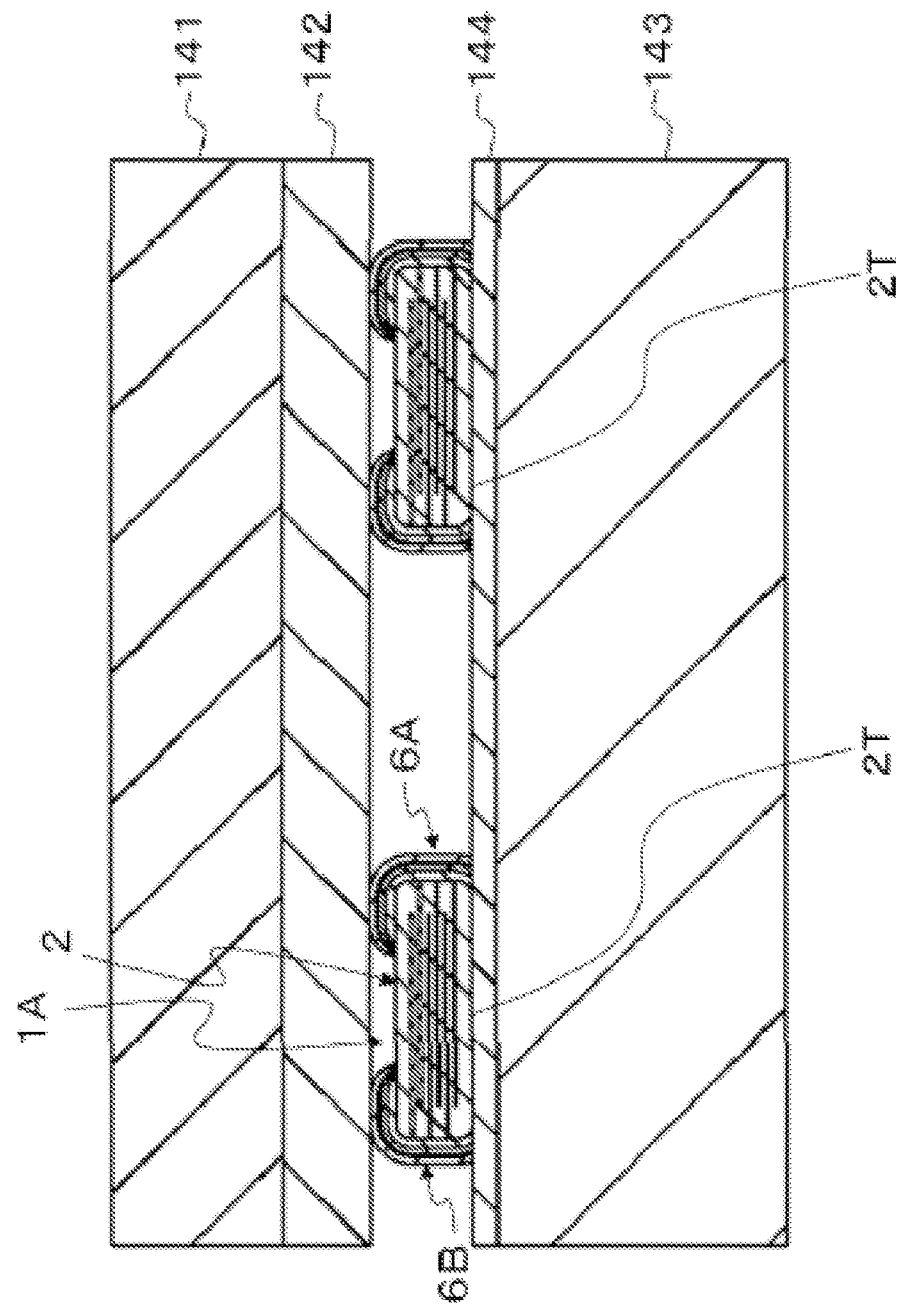
FIG. 6C is still another cross-sectional view showing an exemplary process of removing the outer electrodes from the upper surface of the element body of the multilayer ceramic capacitor according to the first embodiment.

FIG. 6A to FIG. 6C are a series of cross-sectional views showing an exemplary process of removing the external electrodes 6A and 6B from the upper surface 2T of the element body 2 of the multilayer ceramic capacitor 1A according to the first embodiment.

In FIG. 6A, an adhesive sheet 142 is attached to an upper flat face 141a of a thick plate 141. Then, a plurality of multilayer ceramic capacitor 1A' of FIG. 5I are placed on an upper face 142a of the adhesive sheet 142, and the lower surface 6AU of the outer electrode 6A' and the lower surface 6BU of 6B' are adhered to the upper face 142a of the adhesive sheet 142, respectively. To improve the holding of the multilayer ceramic capacitor 1A' on the adhesive sheet 142, the lower surfaces 6AU and 6BU of the external electrodes 6A' and 6B' may sink (may be slightly received) into the adhesive sheet 142. The plate 141 is, for example, a glass plate. The adhesive sheet 142 is, for example, a foam-releasable (peelable) sheet having double-sided tackiness or a UV-releasable tape having double-sided tackiness.

As shown in FIG. 6B, an abrasive material (polishing element) 144 such as a file is attached on an upper face 143a of the flat base 143. The abrasive material 144 can be attached to the base 143 using a tape or the like. For example, the base 143 is made from glass.

The plate 141 having the external electrodes 6A', 6B' thereon of FIG. 6A is turned upside down and is placed on the base 143 such that the upper surfaces 6AP, 6BP of the external electrodes 6A', 6B' of the multilayer ceramic capacitor 1A' are pressed against the abrasive material 144. A downward load WT may be applied to the plate 141 such that the upper surfaces 6AP, 6BP of the external electrodes 6A', 6B' are pressed against the abrasive material 144 under a desired condition.

At least one of the plate 141 and the base 143 is forced to micro-vibrate horizontally as indicated by the arrow VB in FIG. 6B. This physically polishes (or grinds) the upper surfaces 6AP and 6BP of the external electrodes 6A' and 6B' and removes the external electrodes 6A' and 6B' from the upper surface 2T of the element body 2'. At the same time, the upper surface 2T of the element body 2' is also polished. Thus, the surface roughness Sa of the upper surface 2T of the element body 2' decreases.

Consequently, as shown in FIG. 6C, the multilayer ceramic capacitor 1A is manufactured in which the element body 2 has the polished upper surface 2T, the underlayers 7 have the polished upper end faces MU, the Cu plating layers 9A have the polished upper end faces MA, the Ni plating layers 9B have the polished upper end faces MB and the Sn plating layers 9C have the polished upper end faces MC. All the polished surfaces 2T, MU, MA, MB and MC are level to each other.

In the polishing process of FIG. 6B, the external electrodes 6A' and 6B' are polished. On the other hand, the hard element body 2' containing ceramics is hardly polished. Thus, after the polishing process, the curved surfaces R of the element body 2 are maintained substantially unchanged.

For example, when the external electrode 6A' and 6B' and the element body 2' are polished under the same conditions, the polishing rate of element body 2' relative to the polishing rate of the external electrode 6A', 6B' is between 1/20 and 1/25. The polishing rate is an amount of polished (shaved) per unit time. Thus, when the external electrodes 6A' and 6B' are shaved by 15 μm, the element body 2' is only shaved by 0.60-0.75 μm under the same condition.

Fineness of polishing (abrasive grains) and the pressing load WT are adjusted in view of the strength of the multilayer ceramic capacitor 1A'. Experiments showed that the abrasive grains is preferably fine abrasive grains (#2000 to #6000), and the load per one multilayer ceramic capacitor 1A' is preferably 1 g to 5 g per one multilayer ceramic capacitor 1A'. In addition to these conditions, the speed of horizontal swinging VB in the polishing process and the time of polishing may be adjusted based on the thickness of the external electrode 6A', 6B' to be polished (polishing amount) and the multilayer structure (hardness) of the external electrode 6A', 6B'.

Second Embodiment

A second embodiment of the invention will be described with reference to FIG. 7. In the second embodiment, the multilayer ceramic capacitor 1A of the first embodiment is mounted on a lower mounting substrate 41, and a combination of the capacitor 1A and the lower mounting substrate 41 is mounted on an upper mounting substrate 45. A combination of the capacitor 1A and the lower mounting substrate 41 may be referred to as a substrate arrangement 40. The upper mounting substrate 45 may be referred to as a motherboard. FIG. 7 shows a cross-sectional view of the substrate arrangement 40 and the motherboard 45 according to the second embodiment. The lower mounting substrate 41 has an outer face 41a and an inner face 41b. The inner face 41b may be referred to as a back face 41b. The upper mounting substrate 45 has an outer face 45a and an inner face 45b. The inner face 45b may be referred to as a back face 45b.

In FIG. 7, four land electrodes 42A, 42B, 44A and 44B are formed on the back face 41b of the mounting substrate 41. The multilayer ceramic capacitor 1A is connected to the land electrodes 42A and 42B through solder layers 43A and 43B, respectively, which are attached to the plating layers 9 of the external electrodes 6A and 6B. The solder layer 43A wets up to the left surface 2P of the external electrode 6A but does not reach the top surface 2T of the element body 2. The solder layer 43B wets up to the right surface 2Q of the external electrode 6B but does not reach the top surface 2T of the element body 2. Thus, the upper ends of the solder layers 43A and 43B are lower than the top surface 2T of the element body 2. Solder balls 47A and 47B are formed on the land electrodes 44A and 44B disposed on the back face 41b of the mounting substrate 41, respectively.

It should be noted that although not illustrated in FIG. 7, one or more semiconductor chips are mounted on the outer face 41a of the mounting substrate 41. The semiconductor chip(s) may include a microprocessor, a semiconductor memory, an FPGA (Field-Programmable Gate Array) and/or an ASIC (Application Specific Integrated Circuit).

Land electrodes 46A and 46B are formed on the back face 45b of the upper mounting substrate 45. The upper mounting substrate 45 is connected to the lower mounting substrate 41 via the solder balls 47A and 47B. The upper mounting substrate 45 may be a motherboard, and the substrate arrangement 40 that includes the mounting substrate 41 and the capacitor 1A is mounted on the motherboard 45.

The mounting substrates 41 and 45 are spaced from each other in the height direction DS by the solder balls 47A and 47B. A resin 48 is provided between the mounting substrates 41 and 45 to encapsulate (or seal) the multilayer ceramic capacitor 1A. The resin 48 is, for example, an epoxy resin. The resin 48 may be injected and cured between the mounting boards 41 and 45 after the mounting boards 41 and 45 are connected to each other by the solder balls 47A and 47B. The resin 48 covers the multilayer ceramic capacitor 1A, the solder layers 43A, 43B and the solder balls 47A, 47B, and adheres to the top surface 2T of the element body 2.

Because the multilayer ceramic capacitor 1A is mounted on the back face 41b of the mounting substrate 41, the multilayer ceramic capacitor 1A is placed on the opposite face of the mounting substrate 41 when looked at from the semiconductor chip(s) which is mounted on the outer face 41a of the mounting substrate 41. Thus, it is possible to mount the multilayer ceramic capacitor 1A in close proximity to the semiconductor chip(s) mounted on the outer face 41a of the mounting substrate 41, thereby effectively eliminating noises added to the semiconductor chip(s).

If the height of the multilayer ceramic capacitor 1A is 150 μm or less, the multilayer ceramic capacitor 1A is received in the spacing between the mounting boards 41 and 45, which are connected to each other via the solder balls 47A and 47B. Thus, it is possible to place the multilayer ceramic capacitor 1A on the inner face 41b of the mounting substrate 41 whereas the semiconductor chips are placed on the opposite face (outer face) 41a of the mounting substrate 41.

In the plane of the upper surface 2T of the element body 2, the end faces MU of the underlayers 7, the end faces MA of the Cu plating layers 9A, the end faces MB of the Ni plating layers 9B and the end faces MC of the Sn plating layers 9C form a multilayer structure. Thus, it is possible to reduce the height of the multilayer ceramic capacitor 1A while suppressing a decrease in the transverse rupture strength of the multilayer ceramic capacitor 1A. Also, it is possible to maintain the uniformity of the film thickness of the Cu plating layer 9A, the Ni plating layer 9B and the Sn plating layer 9C. Therefore, it is possible to mount the multilayer ceramic capacitor 1A on the substrate 41 while preventing the cracking of the multilayer ceramic capacitor 1A, and suppressing a decrease in conductivity between the underlayer 7 and the associated plating layer 9, between the land electrode 42A and the left plating layer 9 and between the land electrode 42B and the right plating layer 9. It should be noted that although a combination of the mounting substrate 41 and the capacitor 1A is referred to as a substrate arrangement in the foregoing, a combination of the two mounting substrates 41 and 45 and the capacitor 1A may be referred to as a substrate arrangement.

Third Embodiment

A third embodiment of the present invention will be described with reference to FIG. 8. The same or similar reference numerals are used for the same or similar elements in the first and third embodiments. FIG. 8 is a cross-sectional view showing a configuration example of a multilayer ceramic capacitor 1B according to the third embodiment.

As shown in FIG. 8, the multilayer ceramic capacitor 1B includes an element body 2B in place of the element body 2 of the multilayer ceramic capacitor 1A of FIG. 2A. In the multilayer ceramic capacitor 1B, the center area of the upper surface 2T of the element body 2B is raised relative to the end faces MU, MA, MB and MC. The cross-sectional shape of the upper surface 2T along the length direction DL of the element body 2B may be arcuate or arch-shaped. It is preferable that the protruding amount HS of the center portion 2TC of the upper surface 2T of the element body 2B with respect to the end faces MU, MA, MB, and MC is 3 μm or less.

In this configuration, when polishing (grinding) the external electrodes 6A' and 6B' with the polishing element 144, the fixed state of the multilayer ceramic capacitor 1A' (such as the adhesive state of the adhesive sheet 42 in FIG. 6A) may be altered such that the inclination of the element body 2' periodically changes on the adhesive sheet 42 based on the fine swinging VB (FIG. 6B). During the polishing process, it is possible to increase the polishing amount of the end portions of the upper surface 2T of the element body 2' than the polishing amount of the center portion 2TC such that the center portion 2TC of the element body 2B can have an arc shape that rises gently. As a result, the external electrodes 6A and 6B become lower than the center portion 2TC of the element body 2B, as shown in FIG. 8. It should be noted that, the center portion 2TC of the element body 2B may be flat.

If the center portion 2TC of the upper surface 2T of the element body 2B is raised as shown in FIG. 8, it is possible to enhance the transverse rupture strength of the multilayer ceramic capacitor 1B. When the multilayer ceramic capacitor 1B undergoes an machine-inspection process and/or a machine-taping process after the polishing process, the orientation of the multilayer ceramic capacitor 1B may accidentally deviate from a desired direction and/or the upper surface 2T of the element body 2B may face downward. Even in such occasions, the convex center portion 2TC of the element body 2B prevents the end faces MU, MA, MB, MC of the external electrodes 6A and 6B from being rubbed by contact elements and/or conveying elements of an inspection machine and a taping machine (e.g., feeders). Therefore, if the upper surface 2T of the element body 2B has the convex center portion 2TC, it is possible to suppress or avoid the breakage of the multilayer structures of the external electrodes 6A and 6B even when the multilayer structures (the end faces MU, MA, MB, MC) of the external electrodes 6A and 6B are exposed.

Fourth Embodiment

Figure 9A:
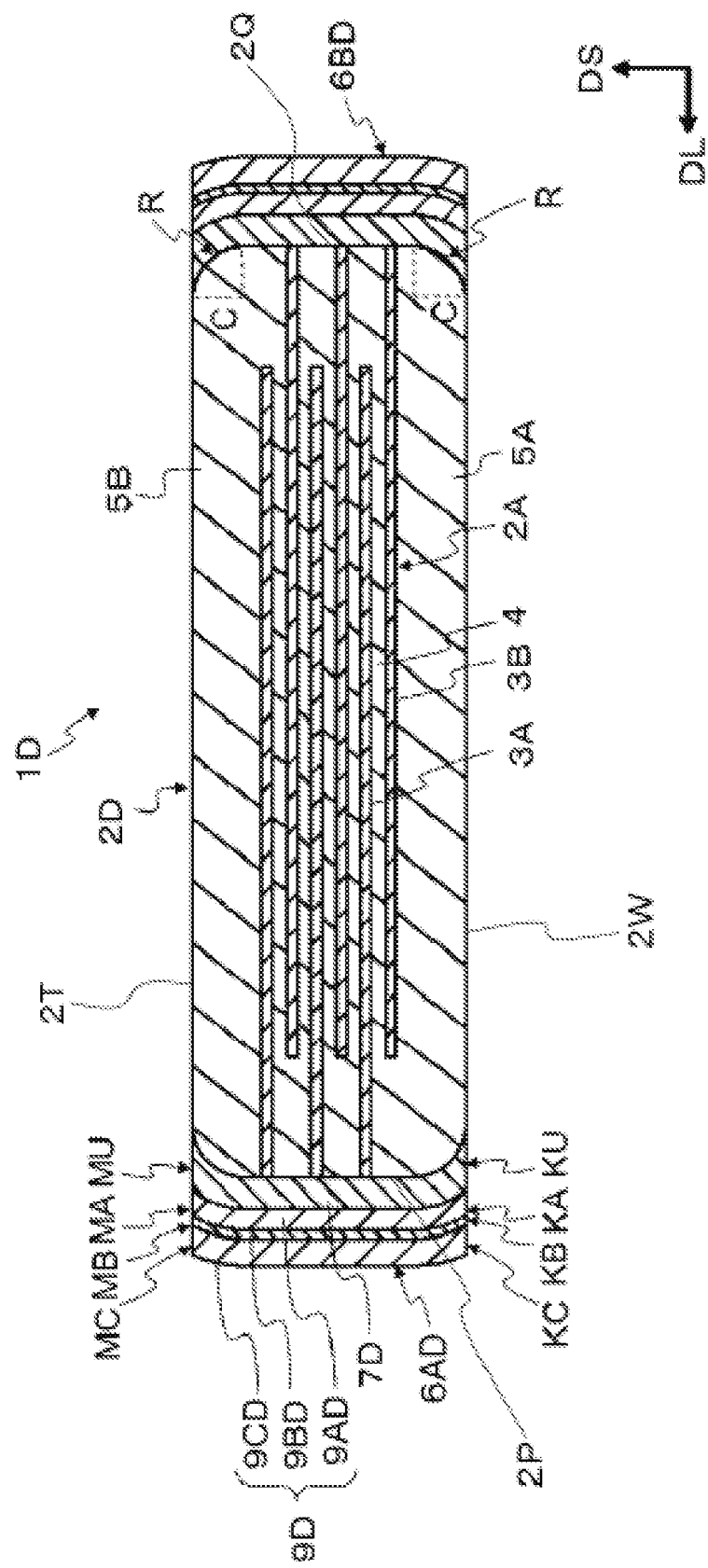
FIG. 9A is a cross-sectional view of a multilayer ceramic capacitor according to a fourth embodiment of the present invention, cut in the length direction.
Figure 9B:
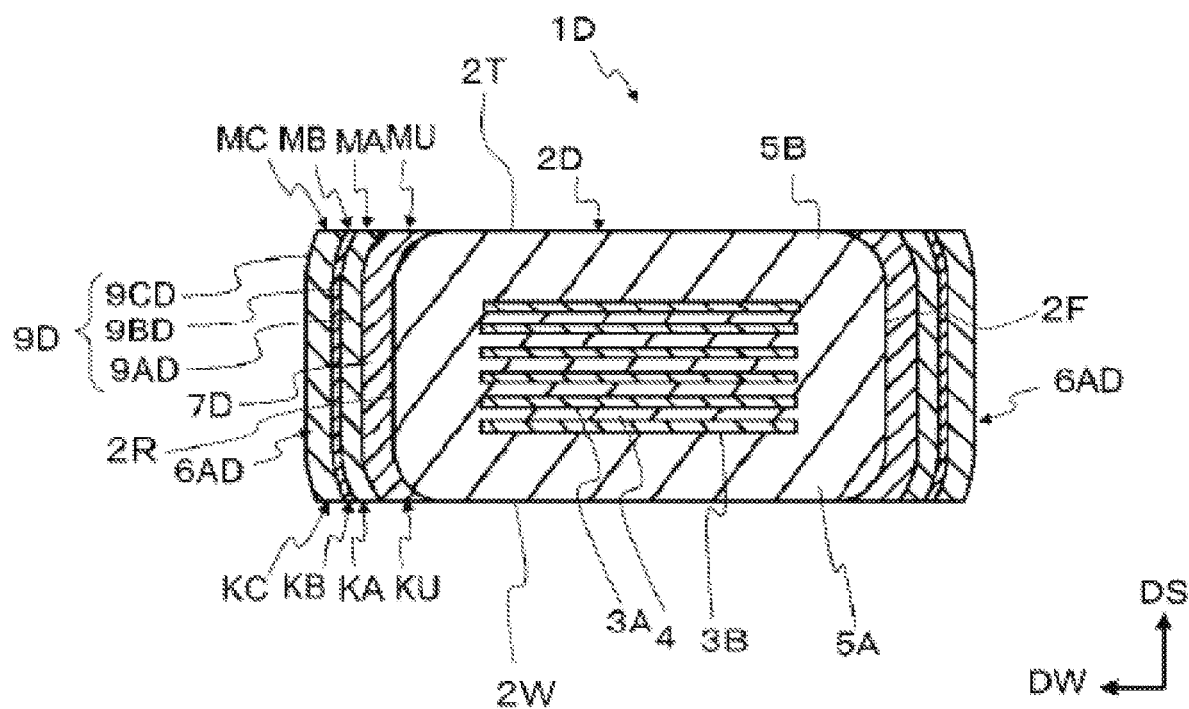
FIG. 9B is a cross-sectional view of the multilayer ceramic capacitor according to the fourth embodiment, cut in the width direction at a position of an external electrode of the multilayer ceramic capacitor.

A fourth embodiment of the present invention will be described with reference to FIG. 9A and FIG. 9B. The same or similar reference numerals are used for the same or similar elements in the first and fourth embodiments. FIG. 9A is similar to FIG. 2A and shows a cross-sectional view of a multilayer ceramic capacitor 1D according to the fourth embodiment, taken along the length direction DL of the multilayer ceramic capacitor 1D. The multilayer ceramic capacitor 1D have two external electrodes 6AD and 6BD. FIG. 9B is similar to FIG. 2B and shows a cross-sectional view of the multilayer ceramic capacitor 1D, taken along the width direction DW at the position crossing the external electrodes 6AD and 6BD.

In FIG. 9A and FIG. 9B, the multilayer ceramic capacitor 1D includes an element body 2D and the external electrodes 6AD and 6BD instead of the element body 2 and the external electrodes 6A and 6B of the multilayer ceramic capacitor 1A of FIG. 2A and FIG. 2B. Surface roughness Sa of the upper surface 2T of the element body 2D is equal to the surface roughness Sa of the lower surface 2W of the element body 2D. The surface roughness Sa of the upper surface 2T is preferably 0.20 μm or less, and the surface roughness Sa of the lower surface 2W of the element body 2D is also preferably 0.20 μm or less. Other configurations of the element body 2D may be the same as those of the element body 2 of the first embodiment. The multilayer ceramic capacitor 1D has a flat lower surface. The flat lower surface of the multilayer ceramic capacitor 1D may be formed by applying the process of S12 (FIG. 4) to the lower surface of the multilayer ceramic capacitor 1A of FIG. 5J.

The external electrodes 6AD and 6BD are formed on opposite side faces 2P and 2Q of the element body 2D such that the external electrodes 6AD and 6BD are separated from each other in the longitudinal direction DL of the element body 2D. The external electrodes 6AD and 6BD extend on the side surfaces 2P and 2Q but do not exist on the upper surface 2T and the lower surface 2W of the element body 2D. The external electrodes 6AD and 6BD may also be formed on the front surface 2F and the rear surface 2R of the element body 2D.

Because the external electrodes 6AD and 6BD do not extend over the upper surface 2T and the lower surface 2W of the element body 2D in this embodiment, it is possible to further reduce the height of the multilayer ceramic capacitor 1D, without reducing the number of the inner electrode layers 3A and 3B. Thus, it is possible to provide the LSC structure, without reducing the capacitance of the multilayer ceramic capacitor 1D.

Each of the external electrodes 6AD and 6BD includes a base layer (underlayer) 7D formed on the element body 2D, and a plating layer 9D laminated on the base layer 7D. The base layers 7D are formed on the side surfaces 2P and 2Q of the element body 2D and separated from each other in the longitudinal direction DL of the element body 2D. The base layers 7D are formed on the side surfaces 2P and 2Q of the element body 2D, but are not formed on the upper surface 2T and the lower surface 2W of the element body 2D. The base layers 7D may be formed on the front surface 2F and the rear surface 2R of the element body 2D.

The left plating layer 9D is a continuous layer formed on the left underlayer 7D of the external electrode 6AD, and the right plating layer 9D is a continuous layer formed on the right underlayer 7D of the external electrode 6BD. The plating layers 9D are not formed on the upper surface 2T and the lower surface 2W of the element body 2D. The left plating layer 9D conducts with the inner electrode layers 3A through the left underlayer 7D, and the right plating layer 9D conducts with the inner electrode layers 3B through the right underlayer 7D. If the capacitor 1D is mounted on the substrate 41 of FIG. 7, the plating layers 9D are electrically connected to the terminals 42A and 42B of the substrate 41 through the solder layers 43A and 43B. Each of the plating layers 9D has a multilayer structure (e.g., three-layer structure). For example, the plating layer 9D includes a Cu plating layer 9AD formed on the underlayer 7D, an Ni plating layer 9BD formed on the Cu plating layer 9AD, and an Sn plating layer 9CD formed on the Ni plating layer 9BD. The underlayer 7D has an upper end face MU and a lower end face KU. The Cu plating layer 9AD has an upper end face MA and a lower end face KA. The Ni plating layer 9BD has an upper end face MB and a lower end face KB. The Sn plating layer 9CD has an upper end face MC and a lower end face KC. Each of the Cu plating layer 9AD, the Ni plating layer 9BD, and the Sn plating layer 9CD may be referred to as a sub-plating layer.

The upper surface 2T of the element body 2D is level to the upper end faces MU of the underlayers 7D and the upper end faces MA, MB and MC of the plating layers 9D. Thus, the four end faces MU, MA, MB and MC form a multilayer structure on each of the left and right outer peripheries of the element body 2D when viewed from the top. The lower surface 2W of the element body 2D is level to the lower end faces KU of the underlayers 7D and the lower end faces KA, KB and KC of the plating layers 9D. Thus, the four end faces KU, KA, KB and KC form a multilayer structure on the outer periphery of the element body 2D when viewed from the bottom. The three upper end faces MA, MB and MC of each of the plating layers 9D form a multilayer structure on the outer periphery of the underlayer 7D when viewed from the top. The three lower end faces KA, KB and KC of each of the plating layers 9D form a multilayer structure on the outer periphery of the underlayer 7D when viewed from the bottom. The upper end face MU of each underlayer 7D extends outward from the upper surface 2T of the element body 2D, and the lower end face KU of each underlayer 7D extends outward from the lower surface 2W of the element body 2D. The upper end face MA of each Cu plating layer 9AD extends outward from the upper end face MU of the underlayer 7D, and the lower end face KA of each Cu plating layer 9AD extends outward from the lower end face KU of the underlayer 7D. The upper end face MB of each Ni plating layer 9BD extends outward from the upper end face MA of the Cu plating layer 9AD, and the lower end face KB of each Ni plating layer 9BD extends outward from the lower end face KA of the Cu plating layer 9AD. The upper end face MC of each Sn plating layer 9CD extends outward from the upper end face MB of the Ni plating layer 9BD, and the lower end face KC of each Sn plating layer 9CD extends outward from the lower end face KB of the Ni plating layer 9BD.

The end faces MU, MA, MB, and MC may be coplanar with the upper surface 2T of the element body 2D. The normal direction of each of the end faces MU, MA, MB, and MC and the normal direction of the upper surface 2T of the element body 2D may be parallel to each other. In this configuration, each of the end faces MU, MA, MB, and MC may be a flat surface.

The end faces KU, KA, KB and KC may be coplanar with the lower surface 2W of the element body 2D. The normal direction of each end face KU, KA, KB and KC and the normal direction of the lower surface 2W of the element body 2D may be parallel to each other. In this configuration, each of the end faces KU, KA, KB and KC may be a flat surface.

Each of the underlayers 7D extends upward along the side surface 2P, 2Q of the element body 2D and the upper portion of the underlayer 7D wraps around the curved surface R such that the upper end face MU of the underlayer 7D is coplanar with the upper surface 2T of the element body 2D. The amount of wrapping of the underlayer 7D around the curved surface R may be decided by the radius of curvature C of the curved surface R. Similarly, each of the underlayers 7D extends downward along the side surface 2P, 2Q of the element body 2D and the lower portion of the left underlayer 7 wraps around the lower curved surface R such that the lower end face KU of the underlayer 7D is coplanar with the lower surface 2W of the element body 2D. The amount of wrapping of the underlayer 7D around the lower curved surface R may be decided by the radius of curvature C of the lower curved surface R.

The upper end of each of the underlayers 7D is exposed on the plane of the upper surface 2T of the element body 2D, and not covered with the plating layer 9D (the Cu plating layer 9AD, the Ni plating layer 9BD and the Sn plating layer 9CD). Thus, the layered structure of each of the external electrodes 6AD and 6BD is exposed to the outside of the multilayer ceramic capacitor 1D when viewed from the top. The lower end of each of the underlayers 7D is exposed on the plane of the lower surface 2W of the element body 2D, and not covered with the plating layer 9D (the Cu plating layer 9AD, the Ni plating layer 9BD and the Sn plating layer 9CD). Thus, the layered structure of each of the external electrodes 6AD and 6BD is exposed to the outside of the multilayer ceramic capacitor 1D when viewed from the bottom.

Other configurations of the underlayer 7D, the Cu plating layer 9AD, the Ni plating layer 9BD and Sn plating layer 9CD may be the same as the underlayer 7, the Cu plating layer 9A, the Ni plating layer 9B and the Sn plating layer 9C of the first embodiment.

Because the upper surface 2T of the element body 2D is coplanar with the end faces MU of the underlayers 7D and the end faces MA, MB and MC of the plating layers 9D, and the lower surface 2W of the element body 2D is coplanar with the end faces KU of the underlayers 7D, and the end faces KA, KB and KC of the plating layers 9D, it is possible to manufacture the multilayer ceramic capacitor 1D having no external electrodes 6AD and 6BD on the upper surface 2T and the lower surface 2W of the element body 2D, without breaking the external electrodes 6AD and 6BD. Therefore, it is possible to further reduce the height of the multilayer ceramic capacitor 1D while suppressing a decrease in the transverse rupture strength of the multilayer ceramic capacitor 1D. It is also possible to suppress the non-uniformity of the cross-sectional shape of the respective external electrode 6AD and 6BD when viewed from the top and from the bottom. Thus, it is possible to suppress a decrease in adhesion strength between the element body 2D and the external electrode 6AD and between the element body 2D and the external electrode 6BD.

The upper surface of the ceramic capacitor 1D has the upper end faces MU of underlayers 7D, the upper end faces MA of the Cu plating layers 9AD, the upper end faces MB of the Ni plating layers 9BD and the upper end faces MC of the Sn plating layers 9CD. The lower surface of the ceramic capacitor 1D has the lower end faces KU of underlayers 7D, the lower end faces KA of the Cu plating layers 9AD, the lower end faces KB of the Ni plating layers 9BD and the lower end faces KC of the Sn plating layers 9CD. Thus, it is possible to maintain the uniformity of the film thickness of each of the Cu plating layers 9AD, the Ni plating layers 9BD and the Sn plating layers 9CD. Therefore, it is possible to suppress or avoid a decrease in the strength of each of the external electrodes 6AD and 6BD. It is also possible to suppress or avoid a decrease in the conductivity between the terminal 42A of the substrate 41 and the left plating layer 9D, between the terminal 42B of the substrate 41 and the right plating layer 9D, between the left underlayer 7D and the left plating layer 9D and between the right underlayer 7D and the right plating layer 9D.

Because the outer electrodes 6AD and 6BD are not present on the upper surface 2T and the lower surface 2W of the element body 2D, the upper half of the multilayer ceramic capacitor 1D is symmetrical to the lower half of the multilayer ceramic capacitor 1D. Thus, there is no need to distinguish the top and bottom of the multilayer ceramic capacitor 1D. Therefore, when a mounter performs a nozzle suction process to pick up the multilayer ceramic capacitor 1D, it is unnecessary to place the multilayer ceramic capacitor 1D with the upper surface thereof being directed upward (i.e., the lower surface of the multilayer ceramic capacitor 1D may face upward). This reduces the number of processes required for mounting the multilayer ceramic capacitor 1D on the substrate 41.

Fifth Embodiment

Figure 10:
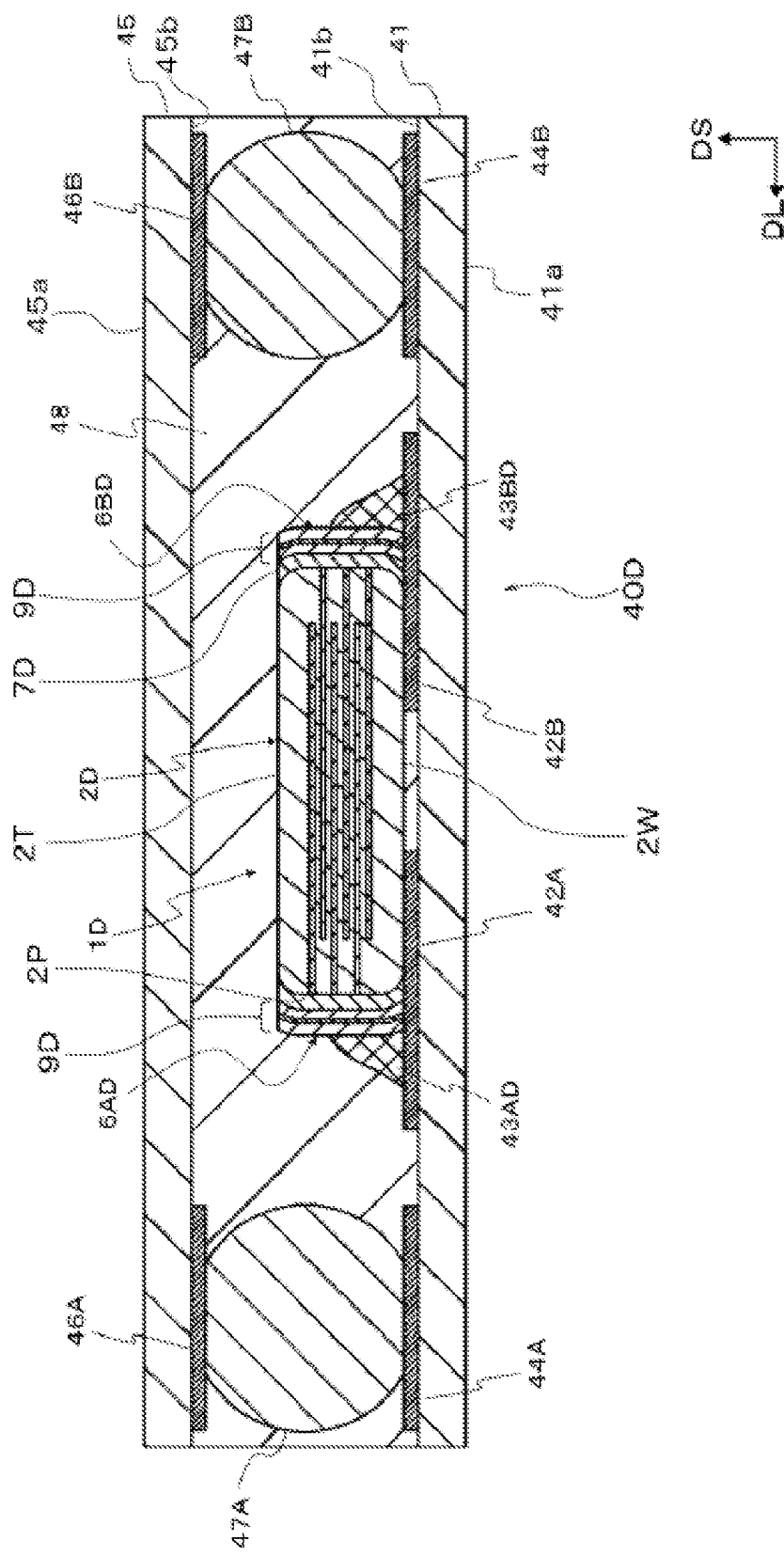
FIG. 10 is a cross-sectional view showing an exemplary configuration of a substrate arrangement, in which a multilayer ceramic capacitor is mounted on a substrate, according to a fifth embodiment of the present invention.

A fifth embodiment of the present invention will be described with reference to FIG. 10. In the fifth embodiment, the multilayer ceramic capacitor 1D of the fourth embodiment is mounted on a lower mounting substrate 41, and a combination of the capacitor 1D and the lower mounting substrate 41 is mounted on an upper mounting substrate 45. A combination of the capacitor 1D and the lower mounting substrate 41 may be referred to as a substrate arrangement 40D. The upper mounting substrate 45 may be referred to as a motherboard. FIG. 10 shows a cross-sectional view of the substrate arrangement 40D and the motherboard 45 according to the fifth embodiment. FIG. 10 is similar to FIG. 7, and the same or similar reference numerals are used in FIG. 7 and FIG. 10 to denote the same or similar elements. There multilayer ceramic capacitor 1D is used instead of the multilayer ceramic capacitor 1A. The lower mounting substrate 41 has the outer face 41a and the inner face 41b. The upper mounting substrate 45 has the outer face 45a and the inner face 45b. Although a combination of the mounting substrate 41 and the capacitor 1D is referred to as a substrate arrangement, a combination of the two mounting substrates 41 and 45 and the capacitor 1D may be referred to as a substrate arrangement.

In FIG. 10, the lower surface 2W of the element body 2D of the multilayer ceramic capacitor 1D may contact the land electrodes 42A and 42B. The multilayer ceramic capacitor 1D is connected to the land electrodes 42A and 42B via solder layers 43AD and 43BD attached to the left and right plating layers 9D of the external electrodes 6AD and 6BD, respectively. Connection between the multilayer ceramic capacitor 1D and the substrate 41 is made through the external electrodes 6AD and 6BD on the left and right side surfaces 2P and 2Q of the element body 2D.

In order to enhance the mounting strength of the multilayer ceramic capacitor 1D to the substrate 41, the solder layers 43AD and 43BD may wet up on the outer electrodes 6AD and 6BD on the front surface 2F and rear surface 2R of the element body 2D. In order to increase the wetting amount of the solder layers 43AD and 43BD to the external electrodes 6AD and 6BD on the front surface 2F and rear surface 2R of the element body 2D, the length of each of the external electrodes 6AD and 6BD on the front surface 2F and rear surface 2R of the element body 2D may be increased.

Sixth Embodiment

Figure 11:
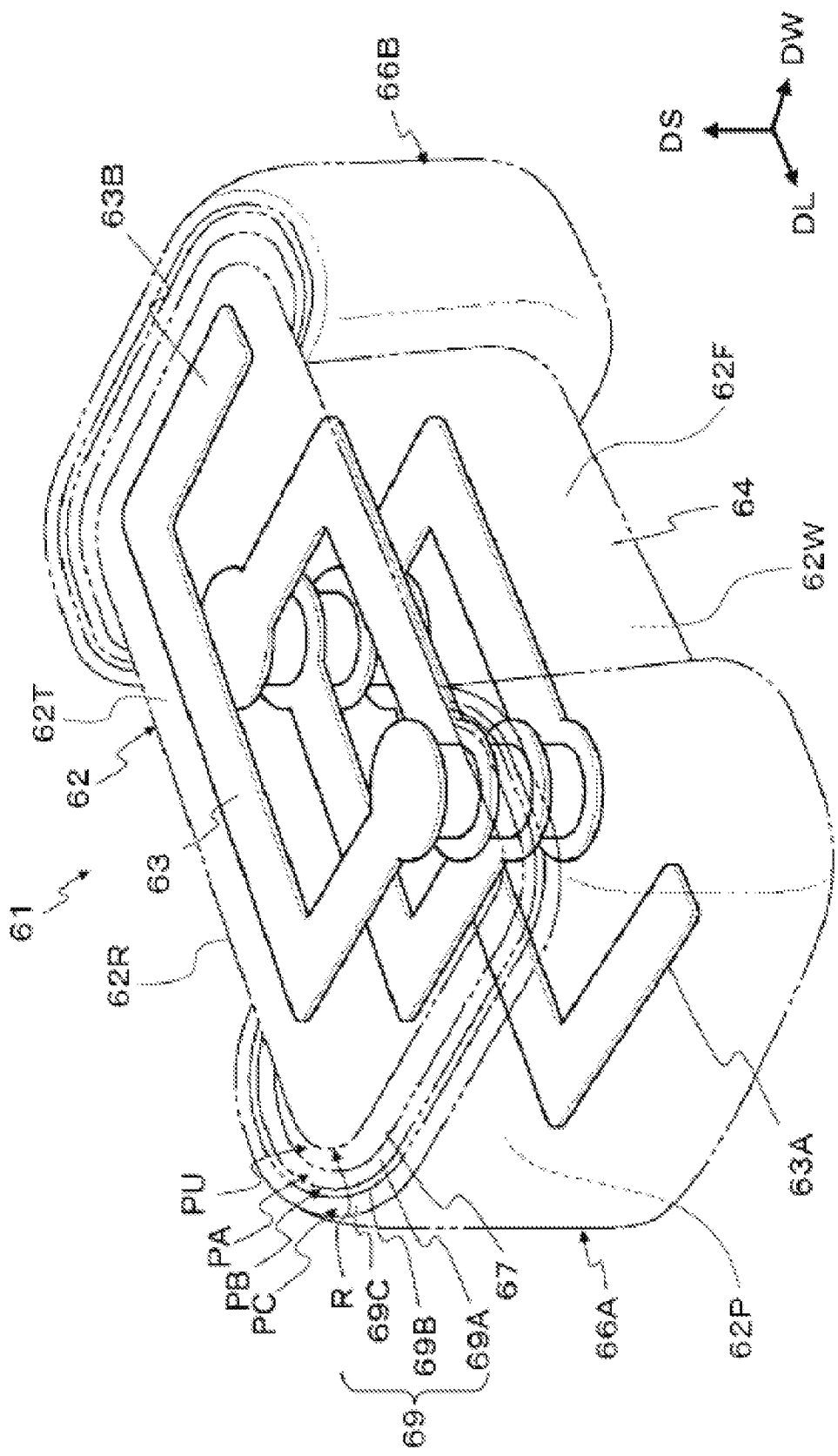
FIG. 11 is a perspective view showing an exemplary configuration of a ceramic electronic component according to a sixth embodiment of the present invention.

A sixth embodiment of the present invention will be described with reference to FIG. 11. FIG. 11 is a perspective view showing a configuration of a ceramic electronic component according to the sixth embodiment. In the sixth embodiment, a chip inductor 61 will be described as an example of the ceramic electronic component.

As shown in FIG. 11, the chip inductor 61 includes an element body 62 and external electrodes 66A and 66B. The element body 62 has a coil pattern 63, internal electrode layers 63A and 63B, and a magnetic material 64. The magnetic material 64 is used as a dielectric to insulate the inner electrode layers 63A and 63B. The element body 62 may have a generally rectangular parallelepiped shape. Each of the external electrodes 66A and 66B has a structure similar to the external electrode 6A, 6B of the first embodiment.

The element body 62 is chamfered along the ridges of the element body 62. A curved surface R is formed at each of the corners of the element body 62 upon chamfering. Surface roughness Sa of the upper surface 62T of the element body 62 is smaller than the surface roughness Sa of the lower surface 62W of the element body 62.

The coil pattern 63 and the internal electrode layers 63A and 63B are generally covered with the magnetic material 64. It should be noted, however, that the left end of the internal electrode layer 63A extends out of the magnetic material 64 from the left surface 62P of the element body 62 and connected to the external electrode 66A. Similarly, the right end of the internal electrode layer 63B extends out of the magnetic material 64 from the other surface (right surface) of the element body 62 and is connected to the external electrode 66B.

The materials of the coil pattern 63 and the inner electrode layers 63A and 63B may be a metal such as Cu, Ni, Ti, Ag, Au, Pt, Pd, Ta or W, for example, or an alloy containing these metals. The magnetic material 64 is, for example, ferrite.

The external electrode 66A is provided on the left surface 62P of the element body 62 and the external electrode 66B is provided on the opposite surface (right surface) of the element body 62. The external electrode 66A is separated from the external electrode 66B in the length direction DL of the element body 62. Each of the external electrodes 66A and 66B is formed on the respective side surface of the element body 62 and extends downward to the bottom surface 62W of the element body 62. Each of the external electrodes 66A and 66B is continuous from the respective side surface to the bottom surface 62W over the respective cured surface R of the element body 62. The external electrodes 66A and 66B are not formed on the top surface 62T of the element body 62. The external electrodes 66A and 66B may extend on the front surface 62F and the rear surface 62R of the element body 62.

Each of the external electrodes 66A and 66B includes a base layer (underlayer) 67 formed on the element body 62, and a plating layer 69 formed on the underlayer 67. The underlayer 67 may be made from a combination of a metal and a co-material. The co-material is, for example, a ferrite component which is a main component of the magnetic material 64. The plating layer 69 has a three-layer structure, for example, and may include a Cu plating layer 69A formed on the underlayer 67, an Ni plating layer 69B formed on the Cu plating layer 69A, and an Sn plating layer 69C formed on the Ni plating layer 69B. Each of the Cu plating layer 69A, the Ni plating layer 69B, and the Sn plating layer 69C may be referred to as a sub-plating layer.

Each of the underlayers 67 extends continuously from the lower surface 62W of the element body 62 to the respective side surface of the element body 62 via the curved surface R, but is not formed on the upper surface 62T of the element body 62. The underlayers 67 may extend to the front surface 62F and the rear surface 62R of the element body 62 from the lower surface 62W (or the side surfaces) of the element body 62. The plating layer 69 is formed for each of the external electrodes 66A and 66B such that the plating layer 69 covers the associated underlayer 67, but is not formed on the upper surface 62T of the element body 62. The underlayer 67D has an upper end face PU, the Cu plating layer 69A has an upper end face PA, the Ni plating layer 69B has an upper end face PB, and the Sn plating layer 69C has an upper end face PC.

The upper surface 62T of the element body 62 is level to the upper end faces PU of the underlayers 67 and the upper end faces PA, PB and PC of the plating layers 69. Thus, the four end faces PU, PA, PB and PC form a multilayer structure on each of the left and right outer peripheries of the element body 62 when viewed from the top. The three upper end faces PA, PB and PC of each of the plating layers 69 form a multilayer structure on the outer periphery of the underlayer 67 when viewed from the top. The upper end face PU of each underlayer 67 extends outward from the upper surface 62T of the element body 62. The upper end face PA of each Cu plating layer 69A extends outward from the upper end face PU of the underlayer 67. The upper end face PB of each Ni plating layer 69B extends outward from the upper end face PA of the Cu plating layer 69A. The upper end face PC of each Sn plating layer 69C extends outward from the upper end face PB of the Ni plating layer 69B.

The end faces PU, PA, PB, and PC may be planar with the upper surface 62T of the element body 62. The normal direction of each of the end faces PU, PA, PB, and PC and the normal direction of the upper surface 62T of the element body 62 may be parallel to each other. In this configuration, each of the end faces PU, PA, PB, and PC may be a flat face. The upper portion of each of the underlayers 67 bends along the curved surface R of the upper surface 62T of the element body 62 such that the upper end face PU of the underlayer 67 is coplanar with the upper surface 62T of the element body 62.

The upper end of each of the underlayers 67 is exposed on the plane of the upper surface 62T of the element body 62, and not covered with the plating layer 69 (the Cu plating layer 69A, the Ni plating layer 69B and the Sn plating layer 69C). Thus, the layered structure of each of the external electrodes 66A and 66B is exposed to the outside of the chip inductor 61. The lower portion of each of the underlayers 67 extends on the lower surface 62W of the element body 62, and is covered with the plating layer 69 (the Cu plating layer 69A, the Ni plating layer 69B and the Sn plating layer 69C).

The outer size of the chip inductor 61 may satisfy a condition of length>width>height, or a condition of length>width=height. In order to reduce the height of the chip inductor 61, the height of the chip inductor 61 is preferably 150 μm or less.

It will be apparent to those skilled in the art that various modifications and variations can be made in the present invention without departing from the spirit or scope of the invention. Thus, it is intended that the present invention encompasses modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A ceramic electronic component comprising:
   an element body including a dielectric and at least one internal electrode therein, the element body having a plurality of surfaces, the plurality of surfaces including a first surface and a second surface opposite the first surface; and
   at least one external electrode formed on the element body, each of the at least one external electrode including a base layer and a plating layer formed on the base layer,
   wherein the base layer is in contact with the internal electrode, contains a metal, and has a first end face adjacent to an outer periphery of the second surface of the element body, and the plating layer has a second end face adjacent to an outer periphery of the first end face such that the first and second end faces form, in combination, a multilayer structure on the outer periphery of the second surface of the element body,
   wherein the element body has a curved chamfered surface at a ridge formed by the second surface, the base layer extends wrapping the curved chamfered surface up to a flat portion of the second surface, and the plating layer extends wrapping along a wrapping portion of the base layer that wraps the curved chamfered surface, and
   wherein the first end face of the base layer is a horizontally flat surface that is level to the flat portion of second surface of the element body, and the second end face of the plating layer is a horizontally flat surface that is level to the plat portion of the second surface of the element body, thereby the first end face of the base layer and the second end face of the plating layer respectively being horizontally flat surfaces flush with each other exposed to an exterior and being coplanar with the plat portion of the second surface of the element body, and the external electrode not covering any portion of the second surface.

2. The ceramic electronic component according to claim 1, wherein each of the at least one external electrode is formed to cover portions of at least two of the plurality of surfaces of the element body except for the second surface.

3. The ceramic electronic component according to claim 1,
   wherein the first end face of the base layer is not covered with the plating layer, and
   wherein a portion of the base layer extends on a portion of the first surface, and said portion of the base layer is covered with the plating layer.

4. The ceramic electronic component according to claim 1,
   wherein the plurality of surfaces of the element body includes at least one third surface perpendicular to the first and second surfaces, and
   wherein the base layer is formed on the third surface, the plating layer is formed on the base layer formed on the third surface, and the first end face of the base layer and the second end face of the plating layer are level to the second surface of the element body, whereby the external electrode does not cover any portion of the second surface.

5. The ceramic electronic component according to claim 1, wherein the first end face of the base layer is located outside the second surface of the element body, and the second end face of the plating layer is located outside the first end face of the base layer.

6. The ceramic electronic component according to claim 1, wherein a normal direction of the second surface, a normal direction of the first end face, and a normal direction of the second end face are parallel to each other.

7. The ceramic electronic component according to claim 1, wherein a radius of curvature of the curved chamfered surface is between 5 μm and 20 μm.

8. The ceramic electronic component according to claim 1, wherein surface roughness of the second surface of the element body is smaller than surface roughness of the first surface of the element body.

9. The ceramic electronic component according to claim 8, wherein the surface roughness of the second surface of the element body is 0.20 μm or less.

10. The ceramic electronic component according to claim 1, wherein the plating layer has a multilayer structure that includes a plurality of sub-plating layers having different metal components, and the second end face of the plating layer is defined by a plurality of end faces of the plurality of sub-plating layers such that the plurality of end faces of the plurality of sub-plating layers form a multilayer structure outside the element body.

11. The ceramic electronic component according to claim 1, wherein the at least one internal electrode includes at least one first internal electrode layer and at least one second internal electrode layer, and the element body includes a laminate that has at least one dielectric layer having the dielectric, the at least one first internal electrode layer and the at least one second internal electrode layer such that the at least one first internal electrode layer and the at least one second internal electrode layer are alternately laminated via the at least one dielectric layer, the plurality of surfaces of the element body includes two opposite third surfaces that are perpendicular to the first and second surfaces, respectively, the at least one external electrode includes a first external electrode and a second external electrode provided separately on the two third surfaces, respectively, the at least one first inner electrode layer is connected to the first external electrode, and the at least one second inner electrode layer is connected to the second external electrode.

12. A device, comprising:

a substrate; and the ceramic electronic component as set forth in claim 1, mounted on the substrate via at least one solder layer, wherein the respective solder layer is wetted up onto a side surface of the external electrode without reaching the second surface of the element body.

13. The device according to claim 12 further comprising:

a resin for sealing the ceramic electronic component on the substrate; and at least one solder ball provided on a predetermined surface of the substrate, wherein the ceramic electronic component is mounted on the predetermined surface of the substrate at a different location from the at least one solder ball.

14. The ceramic electronic component according to claim 1, wherein the base layer has a third end face adjacent to an outer periphery of the first surface of the element body, and the plating layer has a fourth end face adjacent to an outer periphery of the third end face such that the third and fourth end faces form, in combination, a multilayer structure on the outer periphery of the first surface of the element body, wherein the element body has a curved chamfered surface at a ridge formed by the first surface, the base layer extends wrapping the curved chamfered surface up to a flat portion of the first surface, and the plating layer extends wrapping along a wrapping portion of the base layer that wraps the curved chamfered surface, and wherein the third end face of the base layer is a horizontally flat surface that is level to the flat portion of the first surface of the element body, and the fourth end face of the plating layer is a horizontally flat surface that is level to the flat portion of the first surface of the element body, thereby the third end face of the base layer and the fourth end face of the plating layer respectively being horizontally flat surfaces flush with each other exposed to the exterior and being coplanar with the flat portion of the first surface of the element body, and the external electrode not covering any portion of the first surface.

* * * * *